US010268451B2

(12) United States Patent
Yu

(10) Patent No.: US 10,268,451 B2
(45) Date of Patent: Apr. 23, 2019

(54) METHOD AND PROCESSING APPARATUS FOR PERFORMING ARITHMETIC OPERATION

(71) Applicant: SAMSUNG ELECTRONICS CO., LTD., Suwon-si (KR)

(72) Inventor: Hyeongseok Yu, Seoul (KR)

(73) Assignee: SAMSUNG ELECTRONICS CO., LTD., Suwon-si, Gyeonggi-Do (KR)

( * ) Notice: Subject to any disclaimer, the term of this patent is extended or adjusted under 35 U.S.C. 154(b) by 269 days.

(21) Appl. No.: 15/076,084

(22) Filed: Mar. 21, 2016

(65) Prior Publication Data

US 2017/0083287 A1 Mar. 23, 2017

(30) Foreign Application Priority Data

Sep. 18, 2015 (KR) .......................... 10-2015-0132608

(51) Int. Cl.
*G06F 7/544* (2006.01)
*G06F 7/548* (2006.01)
*G06F 7/552* (2006.01)
*G06F 7/556* (2006.01)

(52) U.S. Cl.
CPC .............. *G06F 7/548* (2013.01); *G06F 7/544* (2013.01); *G06F 7/552* (2013.01); *G06F 7/556* (2013.01)

(58) Field of Classification Search
None
See application file for complete search history.

(56) References Cited

U.S. PATENT DOCUMENTS

| 6,038,582 | A | 5/2000 | Arakawa et al. |
| 6,327,605 | B2 | 12/2001 | Arakawa et al. |
| 6,976,043 | B2 | 12/2005 | Clifton |
| 7,352,911 | B2 * | 4/2008 | Maurer ................... G06T 5/002 |
| | | | 382/260 |
| 7,366,745 | B1 | 4/2008 | Oberman et al. |
| 7,702,709 | B2 | 4/2010 | Duan |
| 8,346,831 | B1 | 1/2013 | Cai et al. |
| 2003/0037080 | A1 | 2/2003 | Clifton |
| 2003/0140304 | A1 | 7/2003 | Hurt et al. |
| 2004/0024806 | A1 | 2/2004 | Jeong et al. |
| 2005/0160129 | A1 | 7/2005 | Endo |
| 2007/0074008 | A1 * | 3/2007 | Donofrio ................ G06F 7/483 |
| | | | 712/222 |
| 2007/0208796 | A1 * | 9/2007 | Lablans ................... G06F 7/724 |
| | | | 708/492 |

(Continued)

FOREIGN PATENT DOCUMENTS

| JP | 2005-208845 A | 8/2005 |
| JP | 2009-194916 A | 8/2009 |
| KR | 10-0433131 B1 | 5/2004 |

OTHER PUBLICATIONS

European Search Report dated Jan. 31, 2017 in corresponding European Patent Application No. 16166074.1.

(Continued)

*Primary Examiner* — Michael D. Yaary
(74) *Attorney, Agent, or Firm* — F. Chau & Associates, LLC

(57) ABSTRACT

A method of performing an arithmetic operation by a processing apparatus includes determining a polynomial expression approximating an arithmetic operation to be performed on a variable; adaptively determining upper bits for addressing a look-up table (LUT) according to a variable section to which the variable belongs; obtaining coefficients of the polynomial expression from the LUT by addressing the LUT using a value of the upper bits; and performing the arithmetic operation by calculating a result value of the polynomial expression using the coefficients.

17 Claims, 19 Drawing Sheets

(56) References Cited

U.S. PATENT DOCUMENTS

2010/0198893 A1    8/2010   Azadet et al.
2010/0198894 A1    8/2010   Azadet et al.
2010/0198895 A1    8/2010   Azadet et al.
2011/0296146 A1   12/2011   Anand et al.
2013/0091189 A1    4/2013   Cai et al.
2015/0012578 A1    1/2015   Cai et al.

OTHER PUBLICATIONS

Dong-U Lee et al: "Hierarchical segmentation schemes for function evaluation", Field-Programmable Technology (FPT), 2003. Proceedings. 2003 IEEE International Conference on Dec. 15-17, 2003, Piscataway, NJ, USA,IEEE, pp. 92-99, XP010688324.

Dong-U Lee et al: "Hierarchical Segmentation for Hardware Function Evaluation", IEEE Transactions on Very Large Scale Integration(VLSI) Systems, IEEE Service Center, Piscataway, NJ, USA, vol. 17, No. 1, Jan. 1 2009, pp. 103-116, XP011239057.

Hou-Jen Ko et al: "A new non-uniform segmentation and addressing remapping strategy for hardware-oriented function evaluators based on polynomial approximation", IEEE International Symposium on Circuits and Systems. ISCAS 2010—Paris, France, IEEE, US, pp. 4153-4156, XP031724839.

Dong-U Lee et al: "Non-uniform Segmentation for Hardware Function Evaluation" In: "Network and Parallel Computing", Jan. 1, 2003, Springer International Publishing, Cham 032548, XP055337616.

\* cited by examiner

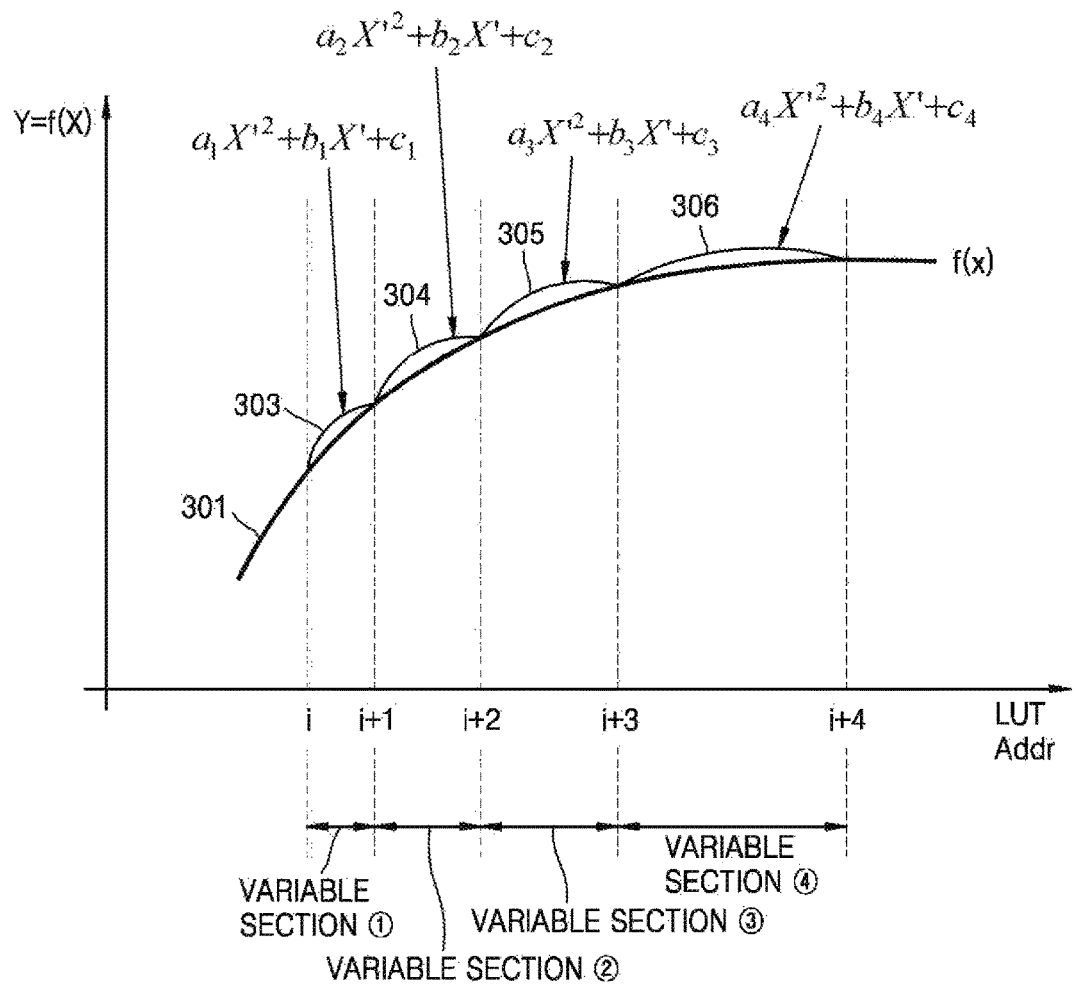

FIG. 7

| ADDRESS | COEFFICIENTS OF SECOND-ORDER POLYNOMIAL EXPRESSION |
|---|---|
| Addr. i | a1, b1, c1 |
| Addr. i + 1 | a2, b2, c2 |
| Addr. i + 2 | a3, b3, c3 |
| Addr. i + 3 | a4, b4, c4 |
| ... | ... |

701

| ADDRESS | COEFFICIENTS OF THIRD-ORDER POLYNOMIAL EXPRESSION |
|---|---|
| Addr. i | a1, b1, c, d1 |
| Addr. i + 1 | a2, b2, c2, d2 |
| Addr. i + 2 | a3, b3, c3, d3 |
| Addr. i + 3 | a4, b4, c4, d4 |
| ... | ... |

| | | | | | | | | | 1410 |
|---|---|---|---|---|---|---|---|---|---|
| 0 | 0 | 0 | X | X | X | X | X | X | |
| 0 | 0 | 1 | X | X | X | X | X | X | |
| 0 | 1 | 0 | X | X | X | X | X | X | |
| 0 | 1 | 1 | X | X | X | X | X | X | |
| 1 | 0 | 0 | X | X | X | X | X | X | |
| 1 | 0 | 1 | X | X | X | X | X | X | |
| 1 | 1 | 0 | 0 | X | X | X | X | X | |
| 1 | 1 | 0 | 1 | X | X | X | X | X | |
| 1 | 1 | 1 | 0 | 0 | X | X | X | X | |
| 1 | 1 | 1 | 0 | 1 | X | X | X | X | |
| 1 | 1 | 1 | 1 | 0 | 0 | X | X | X | |
| 1 | 1 | 1 | 1 | 0 | 1 | X | X | X | |
| 1 | 1 | 1 | 1 | 1 | 0 | 0 | X | X | |
| 1 | 1 | 1 | 1 | 1 | 0 | 1 | X | X | |
| 1 | 1 | 1 | 1 | 1 | 1 | 0 | X | X | |
| 1 | 1 | 1 | 1 | 1 | 1 | 1 | X | X | |

| | | | | | | | | | 1420 |
|---|---|---|---|---|---|---|---|---|---|
| 0 | 0 | 0 | 0 | 0 | 0 | 0 | X | X | X |
| 0 | 0 | 0 | 0 | 0 | 0 | 1 | X | X | X |
| 0 | 0 | 0 | 0 | 0 | 1 | 0 | X | X | X |
| 0 | 0 | 0 | 0 | 0 | 1 | 1 | X | X | X |
| 0 | 0 | 0 | 0 | 1 | 0 | X | X | X | X |
| 0 | 0 | 0 | 0 | 1 | 1 | X | X | X | X |
| 0 | 0 | 0 | 1 | 0 | X | X | X | X | X |
| 0 | 0 | 0 | 1 | 1 | X | X | X | X | X |
| 0 | 0 | 1 | 0 | X | X | X | X | X | X |
| 0 | 0 | 1 | 1 | X | X | X | X | X | X |
| 0 | 1 | 0 | X | X | X | X | X | X | X |
| 0 | 1 | 1 | X | X | X | X | X | X | X |
| 1 | 0 | 0 | X | X | X | X | X | X | X |
| 1 | 1 | 0 | X | X | X | X | X | X | X |
| 1 | 1 | 1 | X | X | X | X | X | X | X |

FIG. 18
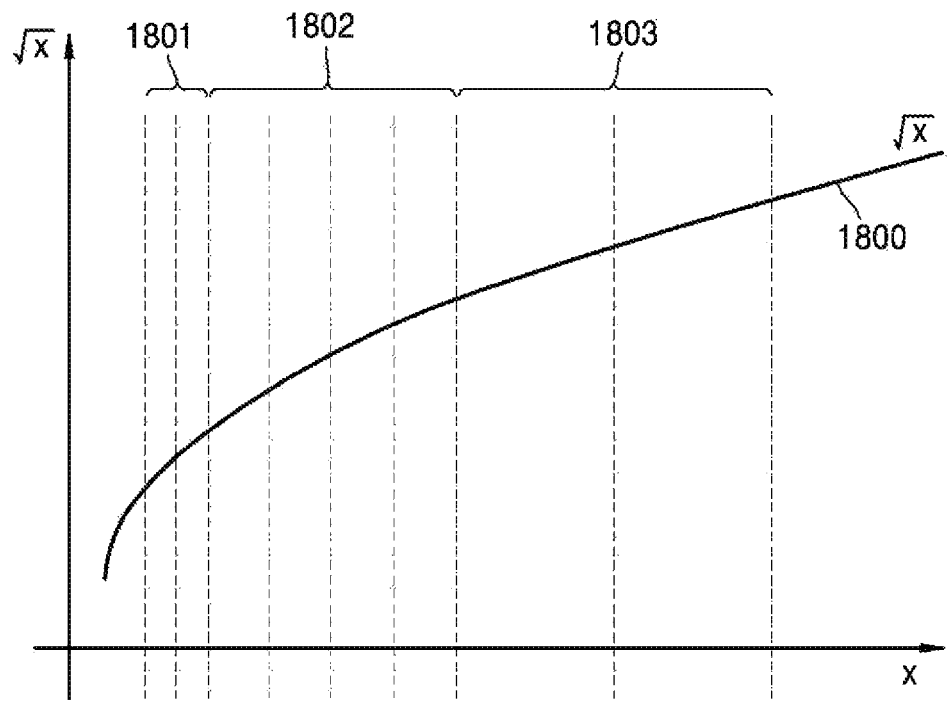
< LUT FOR $\sqrt{x}$ >
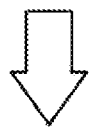

FIG. 20

< LUT FOR $e^x$ >

METHOD AND PROCESSING APPARATUS FOR PERFORMING ARITHMETIC OPERATION

CROSS-REFERENCE TO RELATED APPLICATION(S)

This application claims the benefit under 35 USC 119(a) of Korean Patent Application No. 10-2015-0132608 filed on Sep. 18, 2015, in the Korean Intellectual Property Office, the entire disclosure of which is incorporated herein by reference for all purposes.

BACKGROUND

1. Field

This application relates to a processing apparatus for performing an arithmetic operation, and a method of performing an arithmetic operation with the processing apparatus.

2. Description of Related Art

In computing environments, the importance of processors has been gradually increasing. Processors may be used to process images or moving images having a high resolution, and complicated software algorithms, and development of various processor architecture technologies, such as a dual-core processor, a quad-core processor, and multi-threading, is directly connected to development of related technology fields, such as an image processing field and a software engineering field. In computing environments, the processors operate with limited resources. For example, communication bandwidths between the processors and memories are limited due to performance bottlenecks, and energy consumption of the processors is restricted to a certain level or lower. Accordingly, research has been conducted to increase processing performance within the limited resources of the computing environments.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a method of performing an arithmetic operation by a processing apparatus includes determining a polynomial expression approximating an arithmetic operation to be performed on a variable; adaptively determining upper bits for addressing a look-up table (LUT) according to a variable section to which the variable belongs; obtaining coefficients of the polynomial expression from the LUT by addressing the LUT using a value of the upper bits; and performing the arithmetic operation by calculating a result value of the polynomial expression using the coefficients.

The adaptively determining of the upper bits may further include setting each of addresses of the LUT using non-uniform numbers of upper bits.

The determining of the polynomial expression may further include non-uniformly splitting variables that can be input to the arithmetic operation into variable sections; and the adaptively determining of the upper bits may further include setting addresses of the LUT using numbers of upper bits, the numbers of upper bits respectively corresponding to sizes of the variable sections.

A degree of non-uniformity of the variable sections may be based on an error between the polynomial expression and the arithmetic operation.

The setting of the addresses of the LUT may further include setting the addresses of the LUT using a larger number of upper bits for a variable section in which the error is large, and a smaller number of upper bits for a variable section in which the error is small.

The degree of non-uniformity of the variable sections may depend on a type of the arithmetic operation; and the numbers of upper bits used to set the addresses of the LUT may depend on the type of the arithmetic operation.

The adaptively determining of the upper bits may further include determining a number of the upper bits based on a size of the variable section to which the variable belongs.

The variable may have n bits, and the upper bits may be m upper bits of the n bits, wherein n and m are natural numbers; an input variable of the polynomial expression may be a value of (n−m) lower bits of the variable; and the performing of the arithmetic operation may further include performing the arithmetic operation by calculating the result value of the polynomial expression using the input variable and the coefficients.

The arithmetic operation may be an arithmetic operation for evaluating an elementary function including any one or any combination of any two or more of a square root function, an inverse square root function, a reciprocal function, a log function, an exponential function, a power series function, and a trigonometric function.

The determining of the polynomial expression may further include non-uniformly splitting variables that can be input to the arithmetic operation into variable sections; and the adaptively determining of the upper bits may further include setting addresses of the LUT to respectively correspond to the variable sections using the upper bits.

The polynomial expression may be a k-th order polynomial expression having (k+1) coefficients; and the (k+1) coefficients may be mapped to each of addresses of the LUT.

In another general aspect, a non-transitory computer-readable storage medium stores instructions for causing computing hardware to perform the method described above.

In another general aspect, a processing apparatus for performing an arithmetic operation includes a polynomial expression converter configured to determine a polynomial expression approximating an arithmetic operation to be performed on a variable; an addressing unit configured to adaptively determine upper bits for addressing a look-up table (LUT) according to a variable section to which the variable belongs; an obtainer configured to obtain coefficients of the polynomial expression from the LUT by addressing the LUT using a value of the upper bits; and a calculator configured to perform the arithmetic operation by calculating a result value of the polynomial expression using the coefficients.

The addressing unit may be further configured to set each of addresses of the LUT using non-uniform numbers of upper bits.

The polynomial expression converter may be further configured to non-uniformly split variables that can be input to the arithmetic operation into variable sections; and the addressing unit may be further configured to set addresses of the LUT using numbers of upper bits, the numbers of upper bits respectively corresponding to sizes of the variable sections.

A non-uniformity degree of the variable sections may be based on an error between the polynomial expression and the arithmetic operation; and the addressing unit may be further configured to set the addresses of the LUT using a larger number of upper bits for a variable section in which the error is large, and a smaller number of upper bits for a variable section in which the error is small.

The degree of non-uniformity of the variable sections may depend on a type of the arithmetic operation; and the numbers of upper bits used to set the addresses of the LUT may depend on the type of the arithmetic operation.

The addressing unit may be further configured to determine a number of the upper bits based on a size of the variable section to which the variable belongs.

The variable may have n bits, and the upper bits may be m upper bits of the n bits, wherein n and m are natural numbers; an input variable of the polynomial expression may be a value of (n−m) lower bits of the variable; and the calculator may be further configured to perform the arithmetic operation by calculating the result value of the polynomial expression using the input variable and the coefficients.

The polynomial expression converter may be further configured to non-uniformly split variables that can be input to the arithmetic operation into variable sections; and the addressing unit may be further configured to set addresses of the LUT to respectively correspond to the variable sections using the upper bits.

In another general aspect, a processing apparatus for performing an arithmetic operation includes a polynomial expression converter configured to determine a polynomial expression approximating an arithmetic operation to be performed on a variable; an addressing unit configured to determine a partial address of a look-up table (LUT) configured to store coefficients of the polynomial expression, the partial address identifying a section of the LUT corresponding to a range of variables including the variable on which the arithmetic operation is to be performed; an obtainer configured to obtain coefficients of the polynomial expression from the LUT by addressing the LUT using the partial address; and a calculator configured to perform the arithmetic operation on the variable by evaluating the polynomial expression using the coefficients obtained from the LUT.

The variable on which the arithmetic operation is to be performed may have n bits, and the partial address may be m upper bits of the n bits, wherein n and m are natural numbers; an input variable of the polynomial expression may be (n−m) lower bits of the variable on which the arithmetic operation is to be performed; and the calculator may be further configured to perform the arithmetic operation on the variable by evaluating the polynomial expression using the coefficients obtained from the LUT and the input variable.

The polynomial expression converter may be further configured to determine a plurality of polynomial expressions each approximating the arithmetic operation for a different range of variables; the addressing unit may be further configured to determine a plurality of partial addresses of the LUT each identifying a different section of the LUT storing coefficients of a different one of the polynomial expressions; the obtainer may be further configured to obtain coefficients of one of the polynomial expressions corresponding to a range of variables including the variable on which the arithmetic operation is to be performed by addressing the LUT using the partial address identifying the section of the LUT storing the coefficients of the one polynomial expression; and the calculator may be further configured to perform the arithmetic operation on the variable by evaluating the one polynomial expression using the coefficients obtained from the LUT.

The polynomial expression converter may be further configured to divide an entire range of variables on which the arithmetic operation can be performed into a plurality of different ranges of variables, at least two of the different ranges having different sizes, and determine a plurality of polynomial expressions each approximating the arithmetic operation for a different one of the different ranges of variables.

Each partial address of the partial addresses may have a number of bits that depends on a size of one of the different ranges of variables corresponding to one of the polynomial expressions having the coefficients stored in the section of the LUT identified by the partial address.

Other features and aspects will be apparent from the following detailed description, the drawings, and the claims.

BRIEF DESCRIPTION OF THE DRAWINGS

FIG. 3A is a diagram for describing an example of approximating an arithmetic operation for evaluating an elementary function f(x).

FIG. 3B is a diagram for describing an example of a processing apparatus for performing the arithmetic operation of FIG. 3A.

FIG. 7 illustrates an example of a look-up table (LUT).

FIG. 14 is a diagram for describing examples of methods of determining a number of upper bits for setting addresses of an LUT.

FIG. 18 is a diagram for describing an example of a method of determining numbers of upper bits for setting addresses of an LUT in a case of an elementary function $\sqrt{x}$.

FIG. 20 is a diagram for describing an example of a method of determining numbers of upper bits for setting addresses of an LUT in a case of an elementary function $e^x$.

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent to one of ordinary skill in the art. The sequences of operations described herein are merely examples, and are not limited to those set forth herein, but may be changed as will be apparent to one of ordinary skill in the art, with the exception of operations necessarily occurring in a certain order. Also, descriptions of functions and constructions that are well known to one of ordinary skill in the art may be omitted for increased clarity and conciseness.

The features described herein may be embodied in different forms, and are not to be construed as being limited to the examples described herein. Rather, the examples described herein have been provided so that this disclosure will be thorough and complete, and will convey the full scope of the disclosure to one of ordinary skill in the art.

All terms, including descriptive or technical terms, that are used herein are to be construed as having the meanings that they have to one of ordinary skill in the art. However, the terms may have different meanings according to the intention of one of ordinary skill in the art, legal precedence, or the appearance of new technologies. Also, some terms may be arbitrarily selected by the applicant, and in this case, the meaning of these terms will be described in detail in the detailed description. Thus, the terms used herein are to be interpreted based on the meaning of the terms together with the description throughout the specification.

Also, the terms "includes" and "comprises" used herein are not to be construed as necessarily including all of the elements or operations stated, and some elements or operations may not be included or additional elements or operations may be further included.

Figure 1:
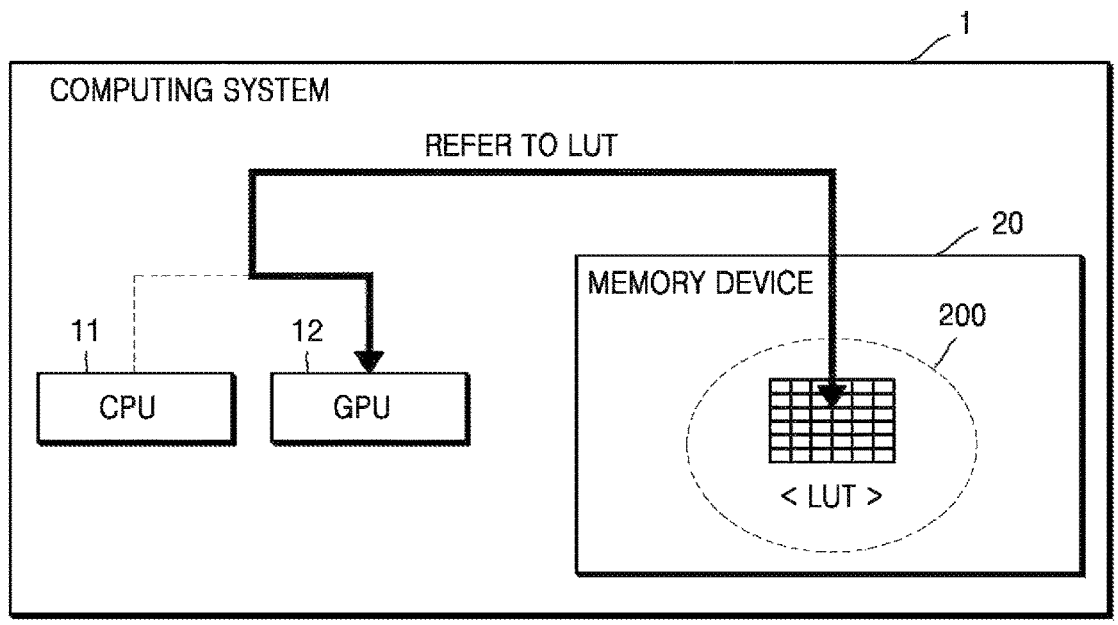
FIG. 1 is a block diagram of an example of a computing system.

FIG. 1 is a block diagram of an example of a computing system 1.

Referring to FIG. 1, the computing system 1 includes a central processing unit (CPU) 11, a graphics processing unit (GPU) 12, and a memory device 20. The CPU 10 and the GPU 12 are processing apparatuses, and the processing apparatuses may be other types of processors besides the CPU 11 and the GPU 12. FIG. 1 illustrates only components of the computing system 1 related to one or more examples described below, but it will be apparent to one of ordinary skill in the art that the computing system 1 may also include other general-purpose components in addition to the components shown in FIG. 1.

Examples of the computing system 1 include a desktop computer, a laptop computer, a smart phone, a personal digital assistant (PDA), a portable media player, a video game console, a television set-top box, a tablet device, an e-book reader, and a wearable device, but are not limited thereto. In other words, various apparatuses may be included in a category of the computing system 1.

Processing apparatuses, such as the CPU 11 and the GPU 12, are hardware that performs various operations. The CPU 11 operates as hardware that controls overall functions of the computing system 1, and controls the remaining components, i.e., the GPU 12 and the memory device 20. The CPU 11 performs various types of operations for controlling functions of the computing system 1. The GPU 12 operates as hardware that controls a graphics processing function of the computing system 1. In other words, the GPU 12 executes various types of graphics pipelines, such as an open graphics library (OpenGL), DirectX, and a compute unified device architecture (CUDA), while performing operations related to the graphics pipelines, such as a shading operation.

The memory device 20 may be a random-access memory (RAM), such as a dynamic random-access memory (DRAM) or a static random-access memory (SRAM), or may be a read-only memory (ROM) or an electrically erasable programmable read-only memory (EEPROM). In other words, the memory device 20 may store data that has finished being processed by the CPU 11 or the GPU 12 (for example, results of arithmetic operations), or may provide data to be executed by the CPU 11 or the GPU 12 (for example, source code).

In this example, the memory device 20 stores a look-up table (LUT) 200 that can be accessed by the processing apparatuses, such as the CPU 11 and the GPU 12. The CPU 11 or the GPU 12 may access the LUT 200 to obtain data required to perform an arithmetic operation. The LUT 200 may be a table in which numerical data is mapped to each address.

Examples of the arithmetic operation include a square root operation, an inverse square root operation, a reciprocal operation, a log operation, an exponential operation, a power series operation, and a trigonometric operation, but are not limited thereto. The square root function, the inverse square root function, the reciprocal function, the log function, the exponential function, the power series function, and the trigonometric function are elementary functions, and the CPU 11 or the GPU 12 performs arithmetic operations for function control or a graphics process of the computing system 1 by evaluating such elementary functions.

For example, when the CPU 11 or the GPU 12 perform a certain type of arithmetic operation, the CPU 11 or the GPU 12 obtains certain numerical data mapped to a certain address by referring to the LUT 200, and quickly processes the certain type of arithmetic operation using the certain numerical data.

Figure 2:
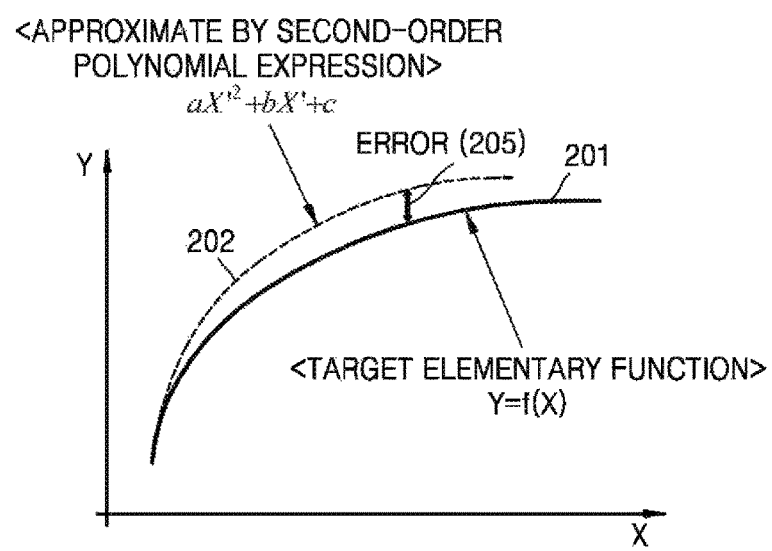
FIG. 2 is a diagram for describing an example of approximating an elementary function using a polynomial expression.

FIG. 2 is a diagram for describing an example of approximating an elementary function using a polynomial expression.

In terms of performance, power, and area (PPA), it may not be efficient if circuits (hardware logic) for directly evaluating elementary functions, such as a square root operation, an inverse square root operation, a reciprocal operation, a log operation, an exponential operation, a power series operation, and a trigonometric operation, are provided inside a processing apparatus. Also, even if such elementary functions can be processed at a software level, PPA may also not be efficient since instructions are invoked in source code and many branch statements are included in the source code. Accordingly, such elementary functions may be approximated by polynomial expressions, and the polynomial expressions may be evaluated to increase a processing performance of a processing apparatus.

Referring to FIG. 2, a target elementary function 201, i.e., Y=f(x), is approximated by a k-th order polynomial expression, wherein k denotes a natural number. For example, the target elementary function 201 is approximated by a second-order polynomial expression 202, i.e., $aX'^2+bX'+c$. An error 205 exists because the target elementary function 201 is approximated by the second-order polynomial expression 202. Accordingly, by reducing the error 205, an accurate result of evaluating the target elementary function 201 may be obtained.

FIG. 3A is a diagram for describing an example of approximating an arithmetic operation for evaluating an elementary function 301, i.e., f(x).

Referring to FIG. 3A, an arithmetic operation for evaluating the elementary function 301 is approximated by a plurality of different second-order polynomial expressions 303 through 306. In detail, the elementary function 301 (i.e., the arithmetic operation) has a variable X, and the variable X is split into variable sections ①, ②, ③, and ④. In the variable section ①, the elementary function 301 is approximated by the second-order polynomial expression 303, i.e., $a_1X'^2+b_1X'+c_1$, in the variable section ②, the elementary function 301 is approximated by the second-order polynomial expression 304, i.e., $a_2X'^2+b_2X'+c_2$, in the variable section ③, the elementary function 301 is approximated by the second-order polynomial expression 305, i.e., $a_3X'^2+b_3X'+c_3$, and in the variable section ④, the elementary function 301 is approximated by the second-order polynomial expression 306, i.e., $a_4X'^2+b_4X'+c_4$. A variable X' is a variable derived from the variable X by excluding upper bits of the variable X as will be explained below, and is input to evaluate the second-order polynomial expressions 303 through 306.

In this example, the term "variable section" denotes a section obtained by splitting a range of variables that can be input to an arithmetic operation, and sizes of the variable sections are non-uniform. As shown in FIG. 3A, sizes of the variable sections ①, ②, ③, and ④ are not uniform. The sizes of the variable sections ①, ②, ③, and ④ are based on errors between the arithmetic operation and the second-order polynomial expressions 303 through 306, and a size of a variable section is small when an error is large, and is large when an error is small.

FIG. 3B is a diagram for describing an example of a processing apparatus for performing the arithmetic operation of FIG. 3A.

Referring to FIG. 3A, coefficients $a_1$ through $c_4$ of the second-order polynomial expressions 303 through 306 are stored in an LUT 310. The processing apparatus obtains, from the LUT 310, coefficients corresponding to variables $X_1$, $X_2$, $X_3$, and so on of the elementary function 301 by accessing the LUT 310, and evaluates the second-order polynomial expressions 303 through 306 using the obtained coefficients, thereby performing the arithmetic operation of the elementary function 301.

The processing apparatus addresses the LUT 310 using addresses corresponding to a variable. For example, when the variable $X_1$ belongs to the variable section ①, the processing apparatus obtains the coefficients $a_1$, $b_1$, and $c_1$ by addressing the LUT 310 using an address Addr. i corresponding to the variable section ①. Also, when the variable $X_2$ corresponds to the variable section ②, the processing apparatus obtains the coefficients $a_2$, $b_2$, and $c_2$ by addressing the LUT 310 using an address Addr. i+1 corresponding to the variable section ②.

Figure 4A:
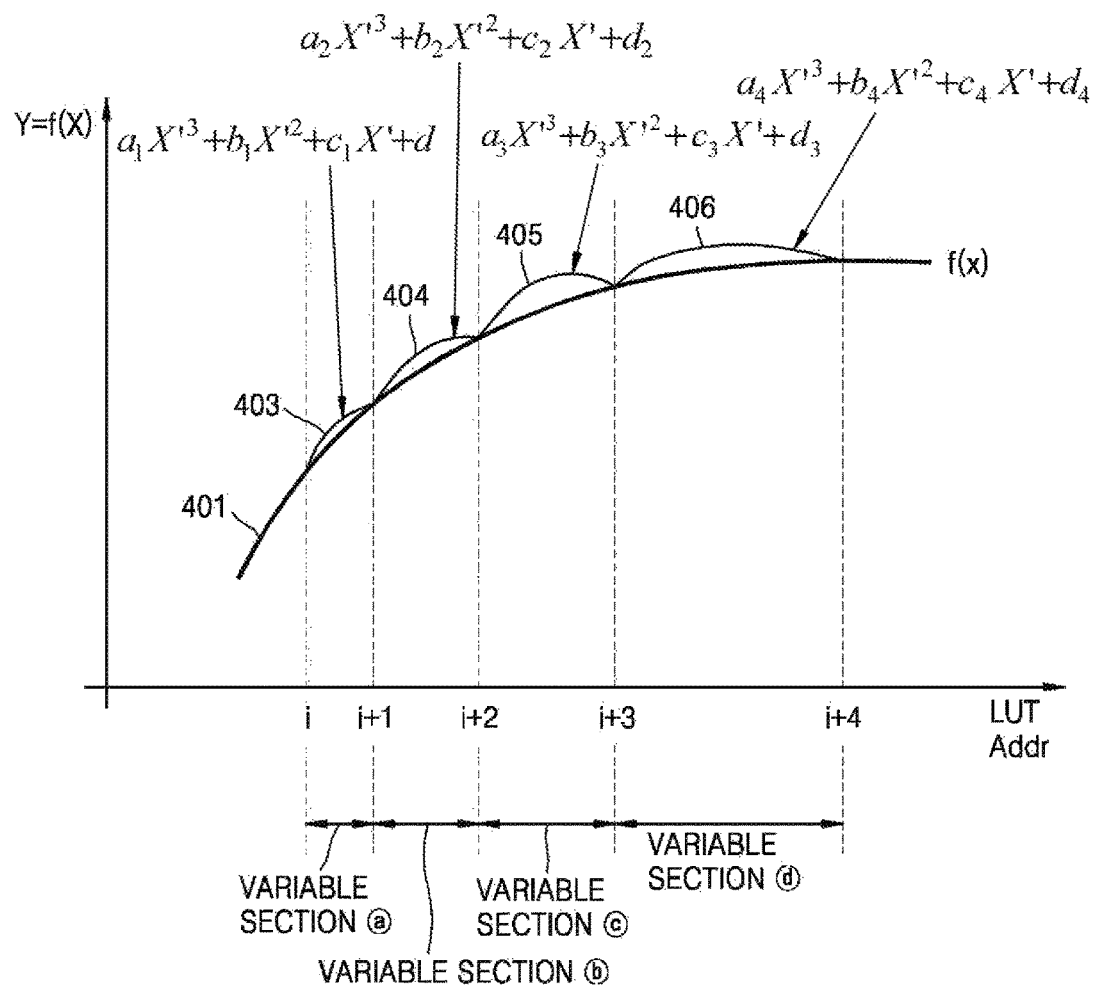
FIG. 4A is a diagram for describing another example of approximating an arithmetic operation for evaluating an elementary function f(x).
Figure 4B:
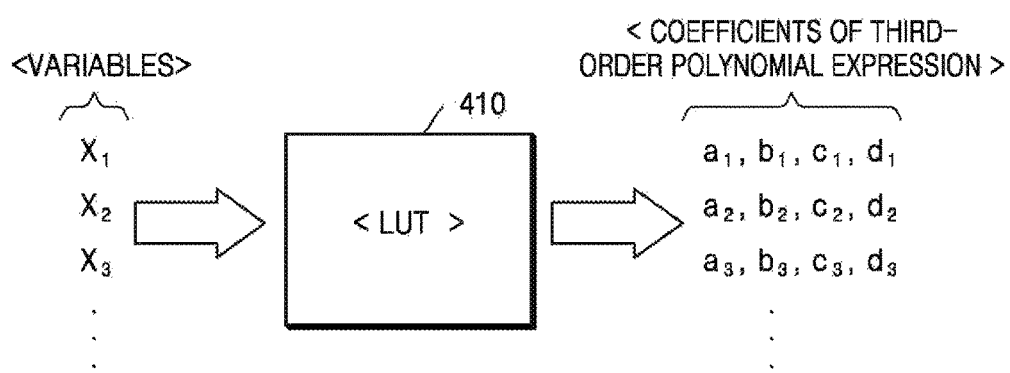
FIG. 4B is a diagram for describing another example of a processing apparatus for performing the arithmetic operation of FIG. 4A.

FIG. 4A is a diagram for describing another example of approximating an arithmetic operation for evaluating an elementary function 401, i.e., f(x). FIG. 4B is a diagram for describing another example of a processing apparatus for performing the arithmetic operation of FIG. 4A.

Referring to FIG. 4A, an arithmetic operation for evaluating the elementary function 401 is approximated by a plurality of third-order polynomial expressions 403 through 406. The elementary function 401 (i.e., the arithmetic operation) has a variable X, and the variable X is split into variable sections ⓐ, ⓑ, ⓒ, and ⓓ. As described above, sizes of the variable sections ⓐ, ⓑ, ⓒ, and ⓓ are non-uniform. The sizes of the variable sections ⓐ, ⓑ, ⓒ, and ⓓ are based on errors between the arithmetic operation and the third-order polynomial expressions 403 through 406, and a size of a variable section is small when an error is large, and is large when an error is small.

Referring to FIG. 4B, the processing apparatus obtains, from an LUT 410, coefficients corresponding to variables $X_1$, $X_2$, $X_3$, and so on of the elementary function 401 by accessing the LUT 410, and evaluates the third-order polynomial expressions 403 through 406 using the obtained coefficients, thereby performing the arithmetic operation of the elementary function 401.

In other words, referring to FIGS. 3A through 4B, an arithmetic operation approximated by a polynomial expression may be performed by a processing apparatus in a similar manner regardless of an order of the polynomial expression.

Figure 5:
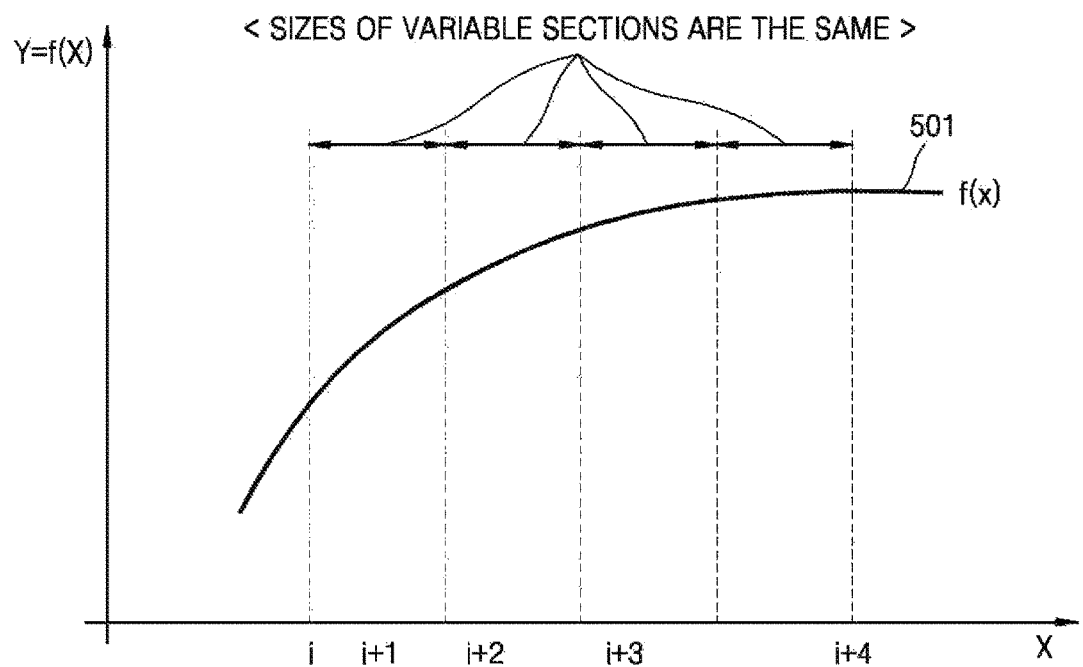
FIG. 5 is a diagram for describing an example of a case in which sizes of variable sections are the same.

FIG. 5 is a diagram for describing an example of a case in which sizes of variable sections are the same.

Referring to FIG. 5, unlike the examples described above with reference to FIGS. 3A and 4A, the sizes of the variable sections in FIG. 5 are the same. In graphs of the types of elementary functions described above, a curve section and a convergent section converging to a certain value exist. When the curve section and the convergent section have the same size, an error between an elementary function and a polynomial expression approximating the elementary function in the curve section is larger than an error between the elementary function and the polynomial expression approximating the elementary function in the convergent section. Accordingly, when the sizes of the variable sections are the same, it is difficult to obtain an accurate result of an arithmetic operation due to the large error in the curve section. However, in the examples described in this application sizes of variable sections are non-uniform in consideration of errors between an elementary function and polynomial expressions approximating the elementary function.

Figure 6:
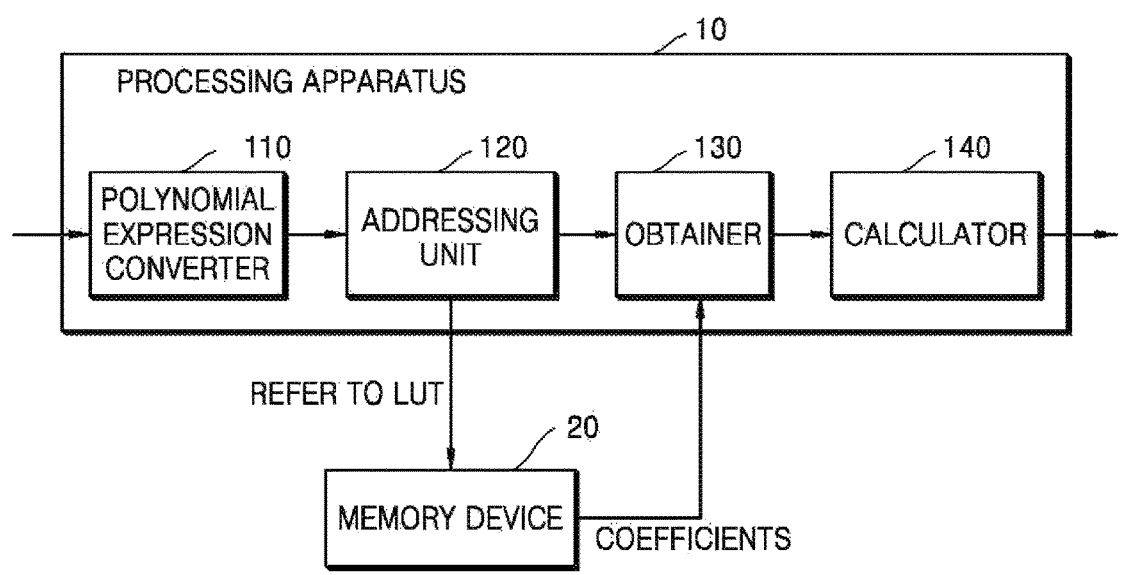
FIG. 6 is a block diagram of an example of a detailed hardware structure of a processing apparatus.

FIG. 6 is a block diagram of an example of a detailed hardware structure of a processing apparatus 10.

Referring to FIG. 6, the processing apparatus 10 includes a polynomial expression converter 110, an addressing unit 120, an obtainer 130, and a calculator 140. FIG. 6 illustrates only components of the processing apparatus 10 related to one or more examples described below, but it will be apparent to one of ordinary skill in the art that the processing apparatus 10 may also include general-purpose components in addition to the components shown in FIG. 6.

The processing apparatus 10 may be the CPU 11 of FIG. 1, the GPU 12 of FIG. 1, another type of processor, or a combination thereof.

The polynomial expression converter 110 determines a polynomial expression that approximates an arithmetic operation to be performed on a variable. The polynomial expression converter 110 determines an order of the polynomial expression approximating the arithmetic operation. In examples described below, the arithmetic operation is approximated by a second or third-order polynomial expression for convenience of description, but the examples are not limited thereto.

The addressing unit 120 adaptively determines upper bits for addressing an LUT (for example, the LUT 200 of FIG. 1) stored in the memory device 20 according to a variable section to which the variable belongs. For example, when the variable is n bits (where n is a natural number), the addressing unit 120 determines m upper bits (where m is a natural number) of the n bits according to a variable section to which the n bits belong. The meaning of adaptively determining the upper bits is that the number of upper bits determined according to the variable section may adaptively vary. Accordingly, the term "adaptively" may be replaced by "dynamically".

The addressing unit 120 determines the number of upper bits according to a size of the variable section to which the variable belongs. For example, when the variable section has a large size, the addressing unit 120 determines a low number of upper bits, and when the variable section has a small size, the addressing unit 120 determines a high number of upper bits.

The addressing unit 120 determines the upper bits to address the LUT. In other words, the addressing unit 120 addresses the LUT using the determined upper bits.

The LUT will now be described. Addresses of the LUT respectively correspond to variable sections, and are set using a non-uniform number of upper bits. In other words, the addresses of the LUT are set by respectively using numbers of upper bits corresponding to sizes of variable sections obtained by the polynomial expression converter 110 non-uniformly splitting variables that can be input to an arithmetic operation into the variable sections. A non-uniformity degree of variable sections is based on an error between an arithmetic operation and polynomial expressions approximating the arithmetic operation as described above with reference to FIGS. 3A and 4A. The addresses of the LUT are set using a larger number of upper bits when an error is large, and a smaller number of upper bits when an error is small.

When the polynomial expression is a k-th order polynomial expression, (k+1) coefficients of the k-th order polynomial expression are mapped to each of the addresses of the LUT. For example, three coefficients are mapped to one address of an LUT for a second-order polynomial expression, and four coefficients are mapped to one address of an LUT for a third-order polynomial expression. In FIG. 1, one LUT is stored in the memory device 20, but the memory device 20 may store different LUTs according to types of arithmetic operations and orders of polynomial expressions approximating the arithmetic operations.

A non-uniformity degree of variable sections is changeable according to types of arithmetic operations, for example, based on whether an arithmetic operation is a log operation, a square root operation, etc. Accordingly, a number of upper bits used as addresses of an LUT is changeable according to types of arithmetic operations.

How the addressing unit 120 determines the number of upper bits using the LUT will be described in detail below.

The obtainer 130 obtains coefficients of the polynomial expression from the LUT by addressing the LUT using a value of the upper bits that are adaptively determined. For example, referring to FIGS. 3A and 3B, when the polynomial expressions determined by the polynomial expression converter 110 are second-order polynomial expressions 303 through 306, the obtainer 130 obtains the coefficients $a_1$ through $c_4$ of the second-order polynomial expressions 303 through 306 from the LUT 310.

The calculator 140 calculates a result value of the polynomial expression using the coefficients, thereby performing the arithmetic operation. In other words, the result value of the polynomial expression is considered a result of performing the arithmetic operation. As described above, when the variable has n bits and the upper bits are m bits of the n bits, an input variable X' of the polynomial expression has a value of (n−m) lower bits of the variable. The calculator 140 performs the arithmetic operation by calculating the result value of the polynomial expression using the input variable X' and the coefficients.

The LUT is pre-stored in the memory device 20. As described above, the memory device 20 may store various LUTs according to types of arithmetic operations or according to orders of polynomial expressions. In the LUT stored in the memory device 20, a number of upper bits to be used as addresses and values of coefficients are changeable according to usage environments of the computing system 1. In other words, data in an LUT may be changed by a user, and a structure of the LUT is not limited. However, addresses of the LUT are set so that the number of upper bits is not uniform.

FIG. 7 illustrates an example of an LUT 701.

Referring to FIG. 7, the LUT 701 includes an address item and a coefficient item. For example, when the LUT 701 is for a second-order polynomial expression, three coefficients of the second-order polynomial expression are mapped to one address of the LUT 701. For example, when the addressing unit 120 of the processing apparatus 10 requests data at an address Addr. i, the obtainer 130 obtains coefficients $a_1$, $b_1$, and $c_1$ from the LUT 701. However, the LUT 701 of FIG. 7 is only an example, and a structure of the LUT 701 may vary. Accordingly, an LUT in the examples described in this application is not limited to the LUT 701 of FIG. 7.

Figure 8:
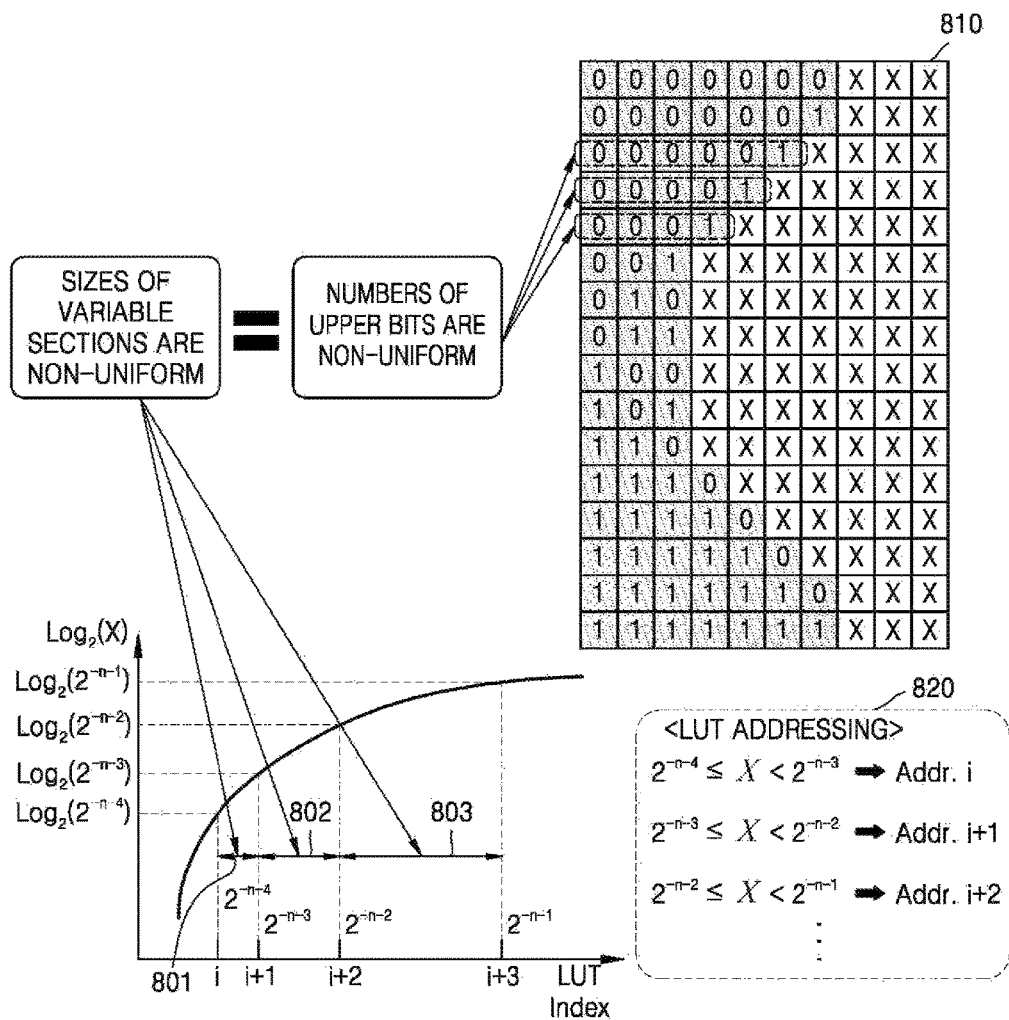
FIG. 8 is a diagram for describing examples of relationships between variable sections, numbers of upper bits, and addresses.

FIG. 8 is a diagram for describing examples of relationships between variable sections, numbers of upper bits, and addresses.

Referring to FIG. 8, an arithmetic operation is an elementary function $\log_2(x)$. Variables that can be input to the elementary function $\log_2(x)$ are split into variable sections 801 through 803 having non-uniform sizes. As described above, in the elementary function $\log_2(x)$, the variables are split into the variable section 801 corresponding to a steep curve section, the variable section 802 corresponding to a gentle curve section, and the variable section 803 corresponding to a convergent section. Sections in FIG. 8 other than the variable sections 801 through 803 are not described for convenience of description.

Sizes of the variable sections 801 through 803 are defined based on the elementary function $\log_2(x)$ and polynomial expressions to be used to approximate the elementary function $\log_2(x)$. For example, when the variable sections 801 and 802 are approximated by one polynomial expression, an error is large compared to the variable section 803. Accordingly, the variable sections 801 and 802 are approximated by two polynomial expressions to reduce an error. The variable section 801 is smaller than the variable section 802 to further reduce an error. Accordingly, variables between a variable $2^{-n-4}$ and a variable $2^{-n-1}$ are split into the variable sections 801 through 803 having non-uniform sizes.

Since the sizes of the variable sections 801 through 803 are not uniform, numbers of variables included in the variable sections 801 through 803 are also different from each other. Accordingly, when a size of a variable section is large, a number of upper bits to be used as an address is small, and when a size of a variable section is small, a number of upper bits to be used as an address is large. In other words, it may be concluded from the non-uniform sizes of the variable sections 801 through 803 that the numbers of upper bits to be used as addresses are non-uniform. For example, referring to a candidate variable list 810, upper bits corresponding to the variable section 801 are "000001", upper bits corresponding to the variable section 802 are "00001", and upper bits corresponding to the variable section 803 are "0001".

According to LUT addressing 820 of the elementary function $\log_2(x)$, when $2^{-n-4} \leq X < 2^{-n-3}$, the variable X belongs to the variable section 801 and addressing is performed to an address Addr. i corresponding to the upper bits "000001", when $2^{-n-3} \leq X < 2^{-n-2}$, the variable X belongs to the variable section 802 and addressing is performed to an address Addr. i+1 corresponding to the upper bits "00001", and when $2^{-n-2} \leq X < 2^{-n-1}$, the variable X belongs to the variable section 803 and addressing is performed to an address Addr. i+2 corresponding to the upper bits "0001".

In relation to FIG. 6, when it is determined that the variable X having 10 bits belongs to the variable section 801, the addressing unit 120 determines six upper bits "000001" of the variable X based on the candidate variable list 810. Then, the obtainer 130 determines that an address corresponding to the upper bits "000001" is Addr. i, and addresses an LUT using the address Addr. i, thereby obtaining coefficients of a polynomial expression approximating the elementary function $\log_2(x)$ in the variable section 801.

Figure 9:
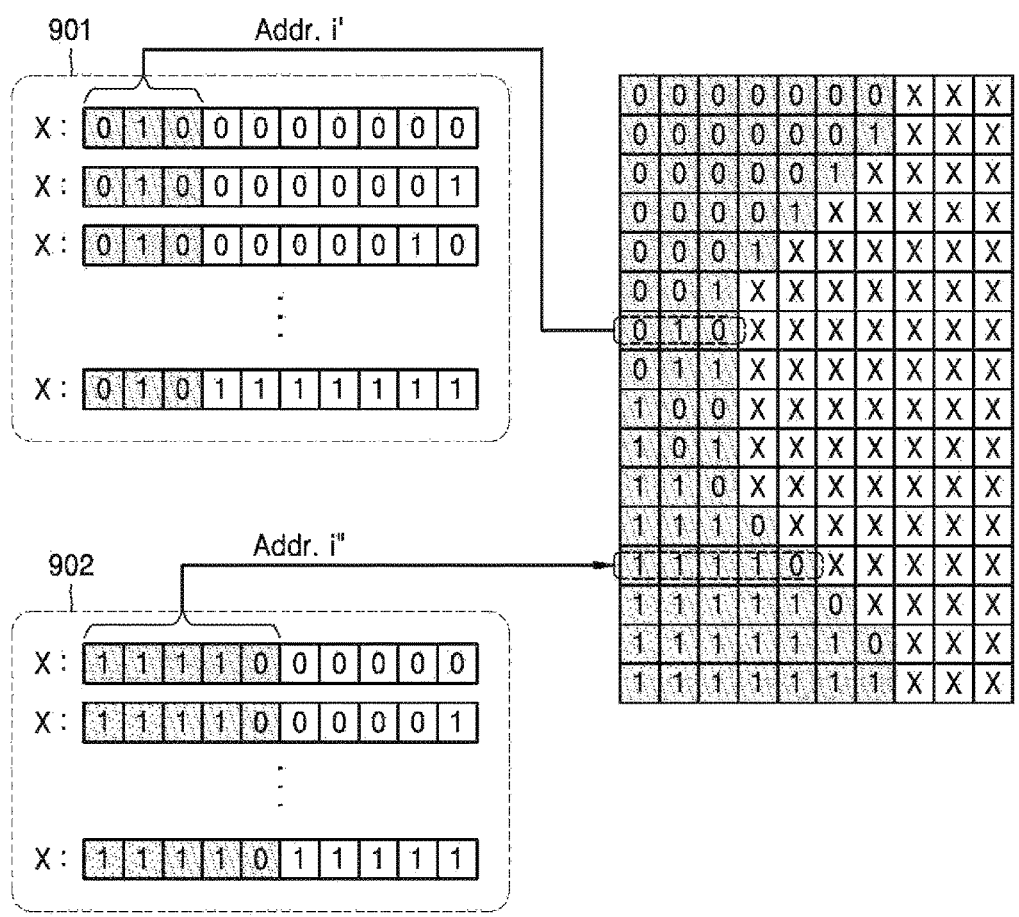
FIG. 9 is a diagram for describing examples of relationships between numbers of upper bits and variable sections.

FIG. 9 is a diagram for describing examples of relationships between numbers of upper bits and variable sections.

As described above, when a size of a variable section increases, a number of upper bits is decreased. On the other hand, when a size of a variable section decreases, a number of upper bits is increased.

Referring to FIG. 9, variables belonging to a variable section 901 have three upper bits "010" and are addressed to an address Addr. i', and variables belonging to a variable section 902 have five upper bits "11110" and are addressed to an address Addr. i". 10-bit variables from "0100000000" to "0101111111" belong to the variable section 901, and 10-bit variables from "1111000000" to "1111011111" belong to the variable section 902. In other words, since more variables belong to the variable section 901 than to the variable section 902, a size of the variable section 901 is larger than a size of the variable section 902.

As such, by setting addresses of an LUT using non-uniform numbers of upper bits, the addresses correspond to variable sections having various sizes. A non-uniformity degree of variable sections is based on an error between an arithmetic operation and polynomial expressions approximating the arithmetic operation in the variable sections, and is a factor arbitrarily defined by a user who wants to generate an LUT according to types of arithmetic operations and orders of polynomial expressions.

Figure 10:
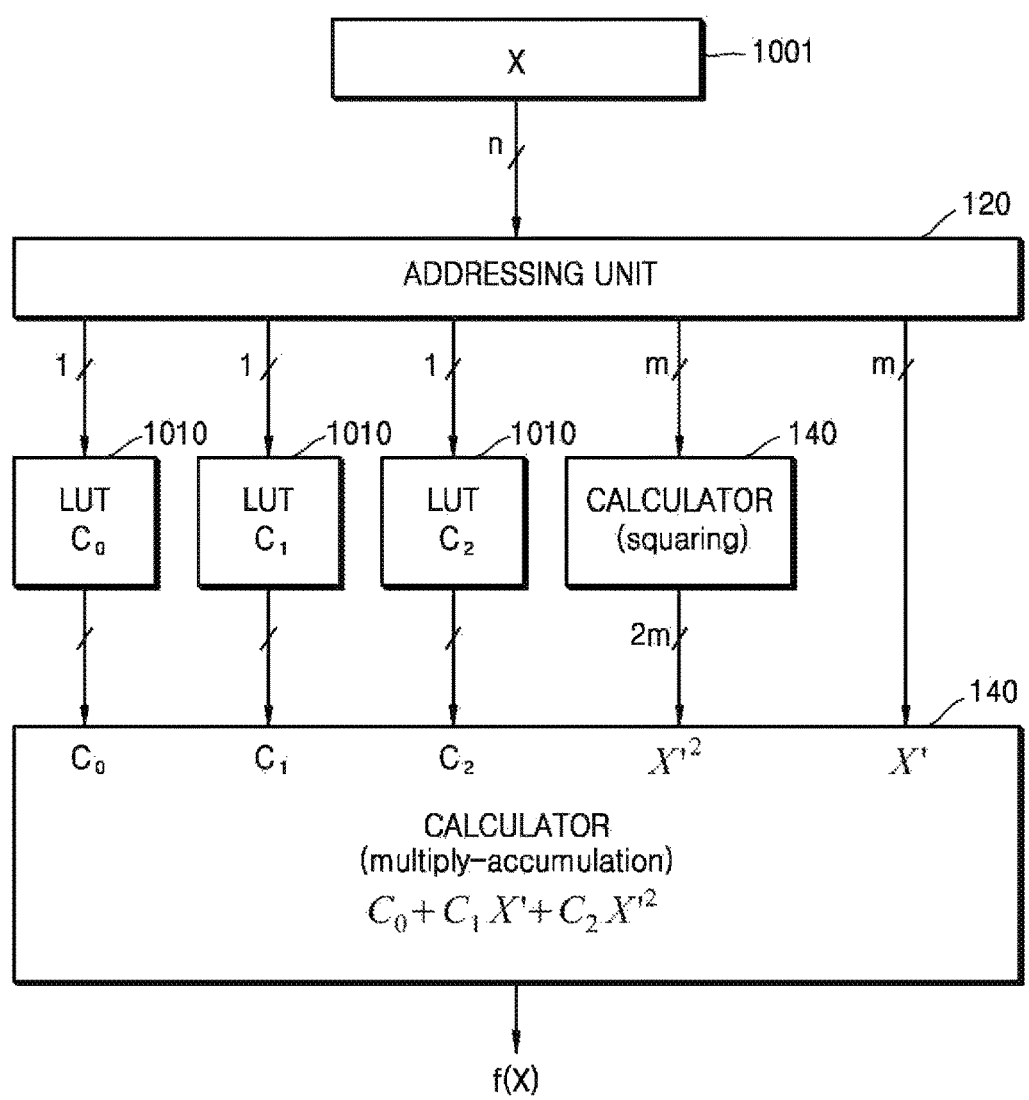
FIG. 10 is a diagram for describing an example of a process performed by a processing apparatus of evaluating a polynomial expression obtained by approximating an arithmetic operation using an LUT.

FIG. 10 is a diagram for describing an example of a process performed by the processing apparatus 10 in FIG. 6 of evaluating a polynomial expression obtained by approximating an arithmetic operation using an LUT.

Referring to FIG. 10, the polynomial expression converter 110 first determines to approximate an arithmetic operation f(x) by a second-order polynomial expression $C_0+C_1X'+C_2X'^2$. An n-bit variable X 1001 is input with respect to the arithmetic operation to be performed by the processing apparatus 10. The arithmetic operation may be any of the types of elementary functions described above. The addressing unit 120 determines an adaptive number of upper bits according to a variable section to which the n-bit variable X 1001 belongs. The obtainer 130 addresses an LUT 1010 using a value of the upper bits, thereby obtaining coefficients $C_0$, $C_1$, and $C_2$ of the second-order polynomial expression $C_0+C_1X'+C_2X'^2$ from the LUT 1010. Unlike the n-bit variable X 1001 of the arithmetic operation, a variable X' to be input to the second-order polynomial expression $C_0+C_1X'+C_2X'^2$ is a value of m lower bits obtained by excluding the determined upper bits from the n-bit variable X 1001. The calculator 140 calculates a variable $X'^2$ by squaring the value of the m lower bits. Finally, the calculator 140 calculates a result value of the second-order polynomial expression $C_0+C_1X'+C_2X'^2$ using the coefficients $C_0$, $C_1$, and $C_2$ and the variables X' and $X'^2$, thereby performing the arithmetic operation.

Figures 11, 12:
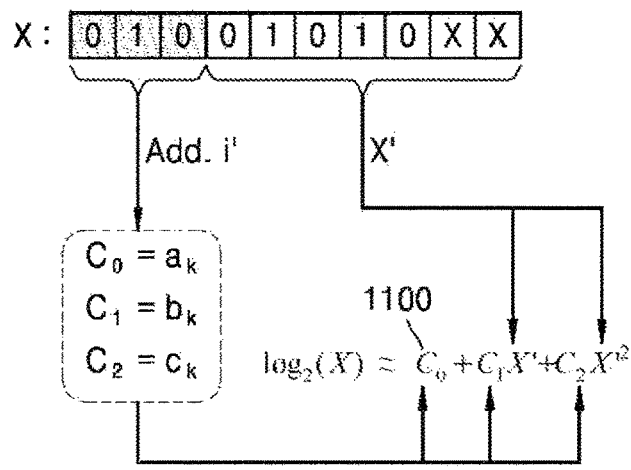
FIG. 11 is a diagram for describing examples of values to be input to a second-order polynomial expression obtained from a 10-bit variable X.
FIG. 12 illustrates another example of an LUT.

FIG. 11 is a diagram for describing examples of values to be input to a second-order polynomial expression obtained from a 10-bit variable X.

Referring to FIG. 11, it is assumed that the 10-bit variable X input to an arithmetic operation to evaluate an elementary function $\log_2(X)$ is "01001010xx". The addressing unit 120 determines three upper bits "010" according to a variable section (for example, the variable section 901 of FIG. 9) to which the 10-bit variable X belongs. As described in FIG. 9, the three upper bits "010" correspond to an address Addr. i of an LUT. The obtainer 130 addresses the LUT using the address Addr. i', thereby obtaining coefficients $a_k$, $b_k$, and $c_k$ of a second-order polynomial expression 1100, i.e., $C_0+C_1X'+C_2X'^2$, from the LUT. Seven lower bits "01010xx" correspond to an input variable X' of the second-order polynomial expression 1100. The calculator 140 calculates a variable $X'^2$ and then calculates a result value of the second-order polynomial expression 1100 using the coefficients $a_k$, $b_k$, and $c_k$ and the variables X' and $X'^2$, thereby performing the arithmetic operation of the elementary function $\log_2(X)$.

FIG. 12 illustrates another example of an LUT 1201.

Referring to FIG. 12, unlike the LUT 701 of FIG. 7, the LUT 1201 is for a third-order polynomial expression. Accordingly, four coefficients of the third-order polynomial expression are mapped to one address in the LUT 1201. As described above, the LUT 701 and the LUT 1201 are pre-stored in the memory device 20, and the processing apparatus 10 uses the LUT 701 or 1201 according to an order of the polynomial expression determined by the polynomial expression converter 110. Although a second or third-order polynomial expression is used in the examples described above, the examples are not limited thereto.

Figure 13:
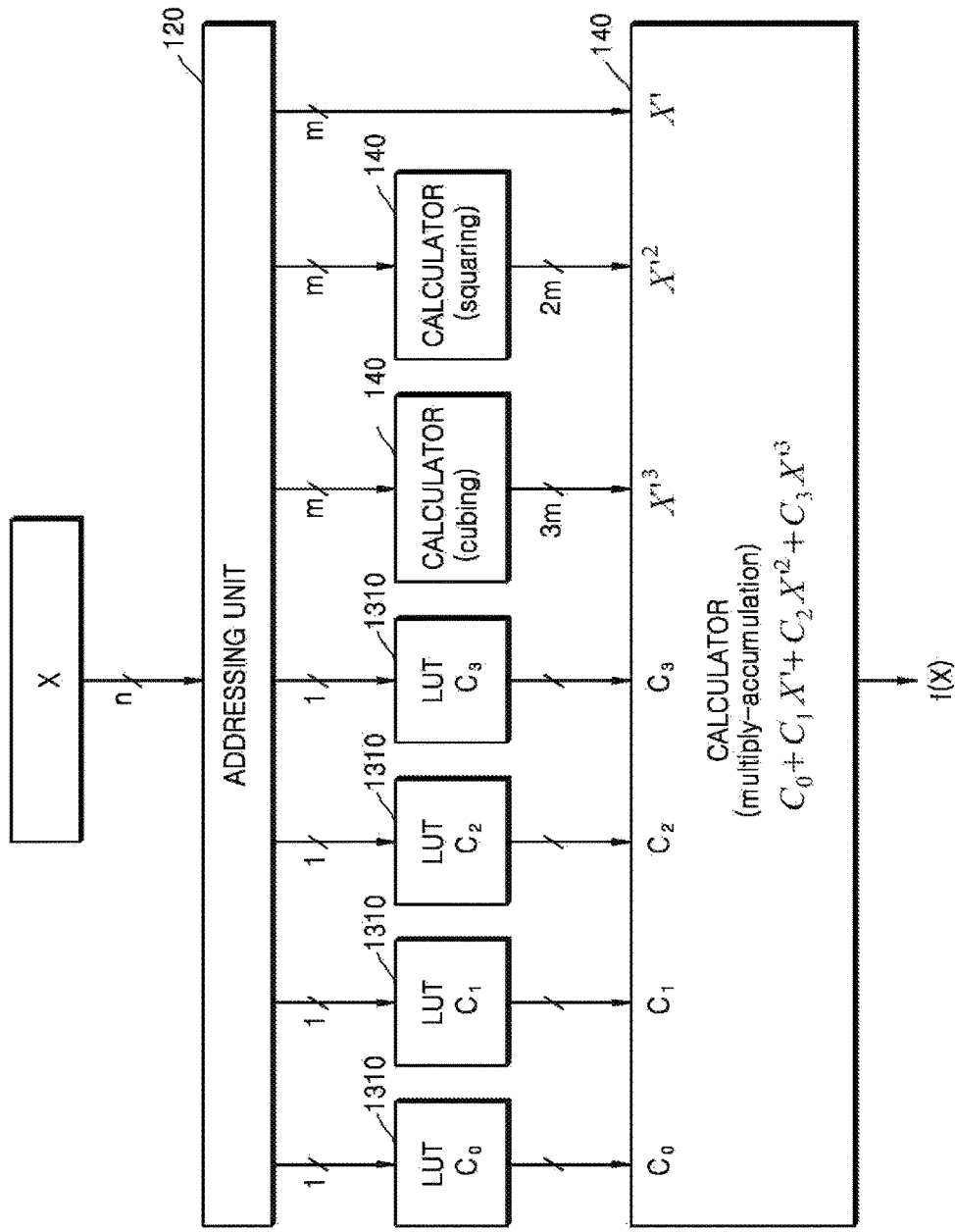
FIG. 13 is a diagram for describing another example of a process performed by a processing apparatus of evaluating a polynomial expression obtained by approximating an arithmetic operation using an LUT.

FIG. 13 is a diagram for describing another example of a process performed by the processing apparatus 10 in FIG. 6 of evaluating a polynomial expression obtained by approximating an arithmetic operation using an LUT.

Unlike FIG. 10 in which processes of evaluating a second-order polynomial expression are shown, FIG. 13 shows processes of evaluating a third-order polynomial expression $C_0+C_1X'+C_2X'^2+C_3X'^3$. The processes of FIG. 13 are performed in a similar manner as the processes of FIG. 10, except that a third-order coefficient $C_3$ is additionally obtained from a LUT 1310 and the calculator 140 additionally calculates a variable $X'^3$.

FIG. 14 is a diagram for describing examples of methods 1410 and 1420 of determining a number of upper bits for setting addresses of an LUT.

Referring to FIG. 14, the method 1410 is performed when variables are split into variable sections having sizes that gradually decrease as variable values increase. Accordingly, when variable values increase, numbers of upper bits to be used as addresses of an LUT increase. The method 1420 is performed when variables are split into variables having sizes that gradually increase as variable values increase. Accordingly, when variable values increase, numbers of upper bits to be used as addresses of an LUT decrease. In other words, numbers of upper bits to be used as addresses of an LUT vary according to types of arithmetic operations, orders of polynomial expressions, accuracy of arithmetic operations, and precision of arithmetic operations.

Figure 15:
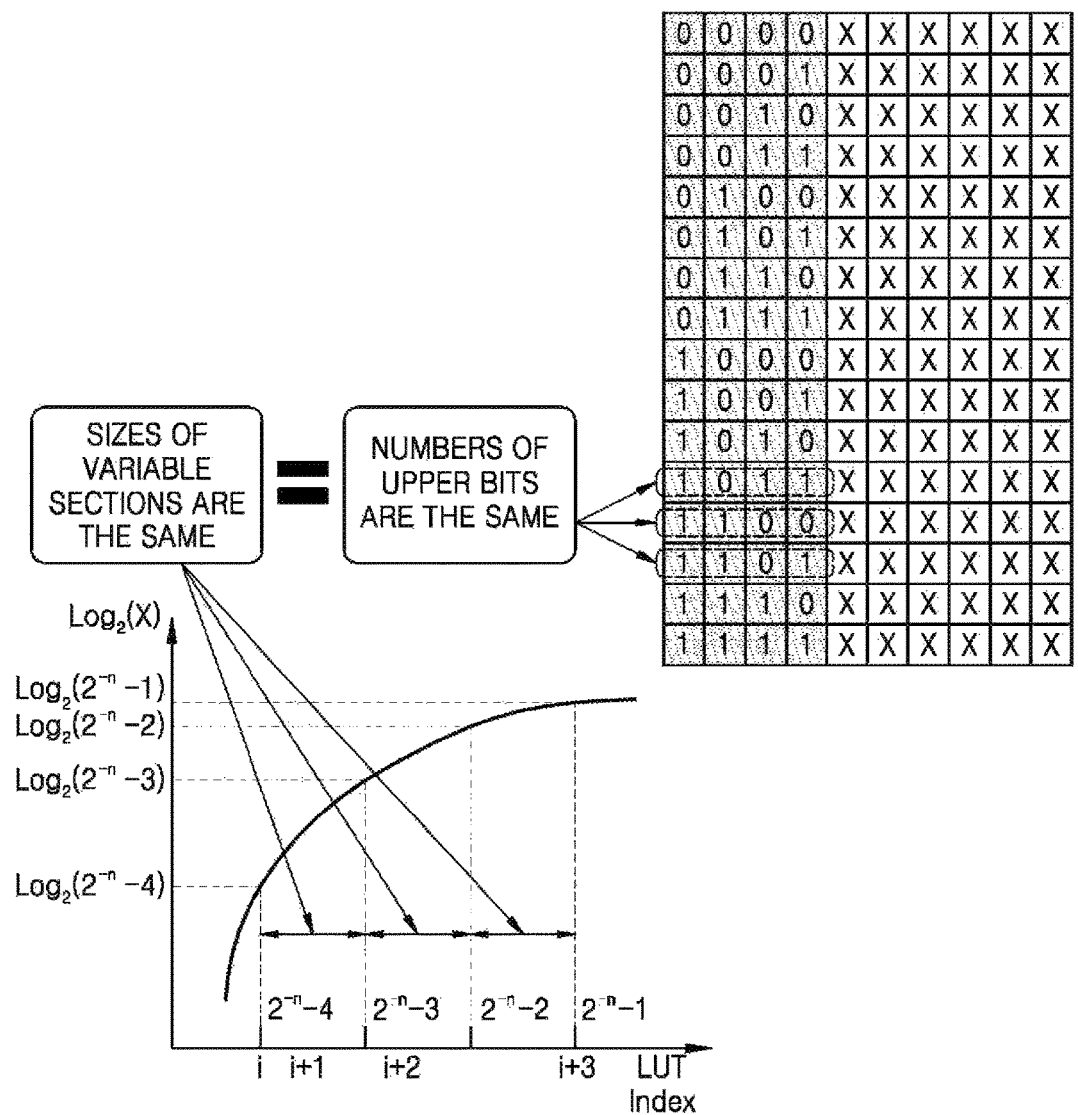
FIG. 15 is a diagram for describing an example of a case in which addresses of an LUT are set using a fixed number of upper bits.

FIG. 15 is a diagram for describing an example of a case in which addresses of an LUT are set using a fixed number of upper bits.

Referring to FIG. 15, using a fixed or uniform number of upper bits to set addresses of an LUT means that sizes of variable sections are the same. As described above, when sizes of variable sections are the same in an elementary function, regions in which errors between the elementary function and polynomial expressions are large and small co-exist, and thus it may be difficult to obtain an accurate result of an arithmetic operation.

Figure 16:
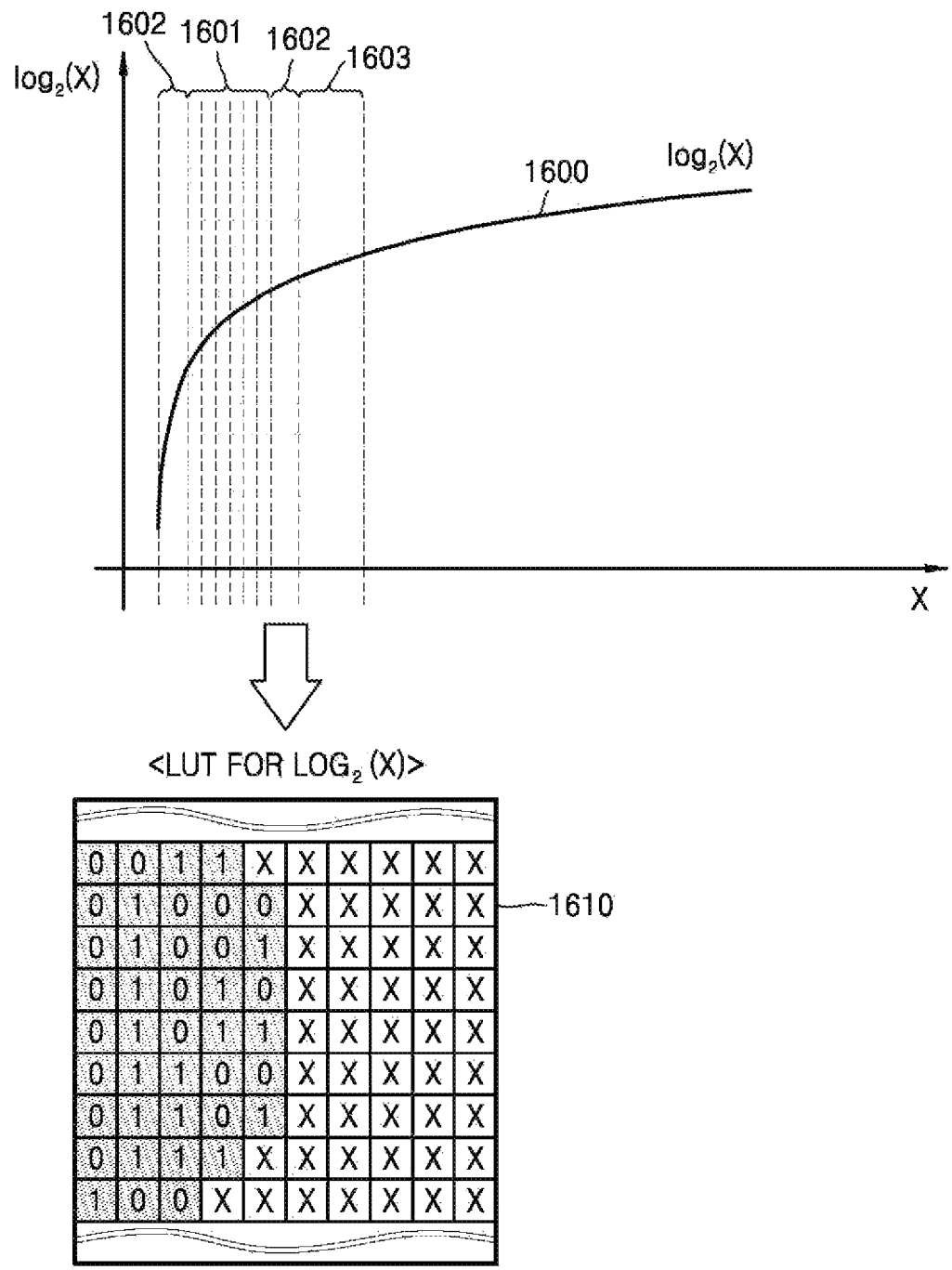
FIG. 16 is a diagram for describing an example of a method of determining numbers of upper bits for setting addresses of an LUT in a case of an elementary function $\log_2(x)$.

FIG. 16 is a diagram for describing an example of a method 1610 of determining numbers of upper bits for setting addresses of an LUT in a case of an elementary function $\log_2(x)$.

Referring to FIG. 16, variables in a graph 1600 of the elementary function $\log_2(x)$ are split into variable sections 1601 through 1603. In the graph 1600, a size of the variable section 1601 corresponding to a curve section is relatively small compared to a size of the variable section 1603 corresponding to a convergent section. In this example, the terms "curve section" and "convergent section" are used for convenience of description, but the example is not limited thereto.

In order to set addresses respectively corresponding to the variable sections 1601, five upper bits are used. In other words, the addresses respectively corresponding to the variable sections 1601 are set using upper bits "01000", "01001", "01010", "01011", "01100", and "01101". In other words, the addresses respectively corresponding to the variable sections 1601 are set using a larger number of upper bits than are used to set addresses respectively corresponding to the variable sections 1602 and 1603 because the sizes of the variable sections 1601 are smaller than the sizes of the variable sections 1602 and 1603. Since the sizes of the variable sections 1602 are smaller than the size of the variable section 1603, the addresses respectively corresponding to the variable sections 1602 are set using four upper bits. An address corresponding to the variable section 1603 having a largest size among the variable sections 1601 through 1603 is set using three upper bits.

The sizes of the variable sections 1601 through 1603 are non-uniform so that errors between the elementary function $\log_2(x)$ and polynomial expressions corresponding to the variable sections 1601 to 1603 are reduced, thereby increasing accuracy or precision of an arithmetic operation. Accordingly, by using non-uniform numbers of upper bits in setting addresses of an LUT to be addressed using an n-bit variable (for example, a 10-bit variable), the errors between the elementary function $\log_2(x)$ and the polynomial expressions corresponding to the variable sections 1601 to 1603 are reduced and the accuracy or precision of the arithmetic operation is increased.

In FIG. 16, the sizes of the variable sections 1601 through 1603 and the method 1610 are shown for convenience of description, but the example is not limited thereto.

Figure 17:
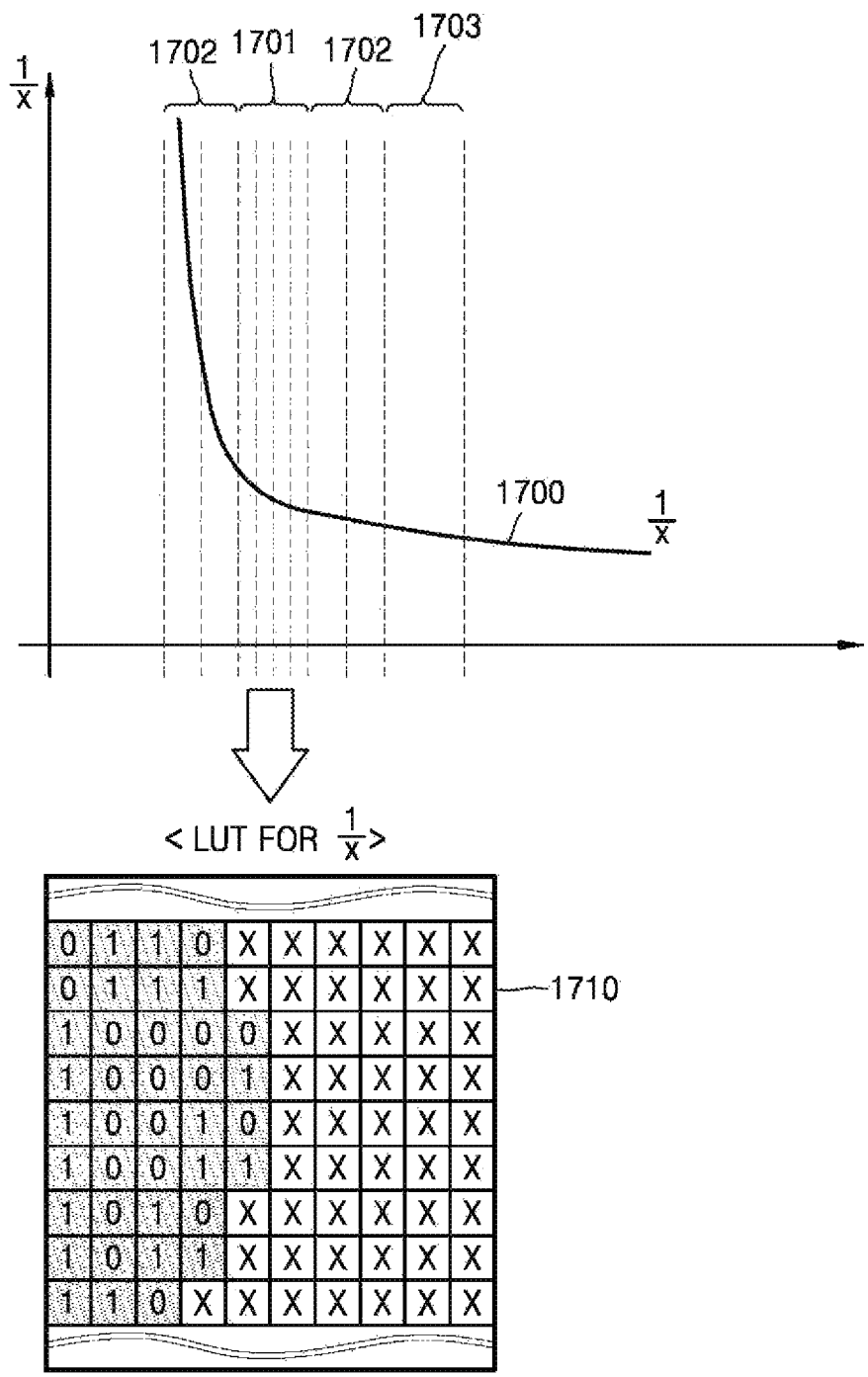
FIG. 17 is a diagram for describing an example of a method of determining numbers of upper bits for setting addresses of an LUT in a case of an elementary function $1/x$.

FIG. 17 is a diagram for describing an example of a method 1710 of determining numbers of upper bits for setting addresses of an LUT in a case of an elementary function $1/x$.

Referring to FIG. 17, like in FIG. 16, variables in a graph 1700 of the elementary function $1/x$ are split into variable sections 1701 through 1703 having non-uniform sizes. Also, numbers of upper bits for setting addresses of an LUT are non-uniform based on the non-uniform sizes of the variable sections 1701 through 1703. In FIG. 17, the non-uniform sizes of the variable sections 1701 through 1703 and the method 1710 are shown for convenience of description, but the example is not limited thereto.

FIG. 18 is a diagram for describing an example of a method 1810 of determining numbers of upper bits for setting addresses of an LUT in a case of an elementary function $\sqrt{x}$.

Referring to FIG. 18, variables in a graph 1800 of the elementary function $\sqrt{x}$ are split into variable sections 1801 through 1803 having non-uniform sizes. Also, numbers of upper bits for setting addresses of an LUT are non-uniform based on the non-uniform sizes of the variable sections 1801 through 1803. In FIG. 18, the non-uniform sizes of the variable sections 1801 through 1803 and the method 1810 are shown for convenience of description, but the example is not limited thereto.

Figure 19:
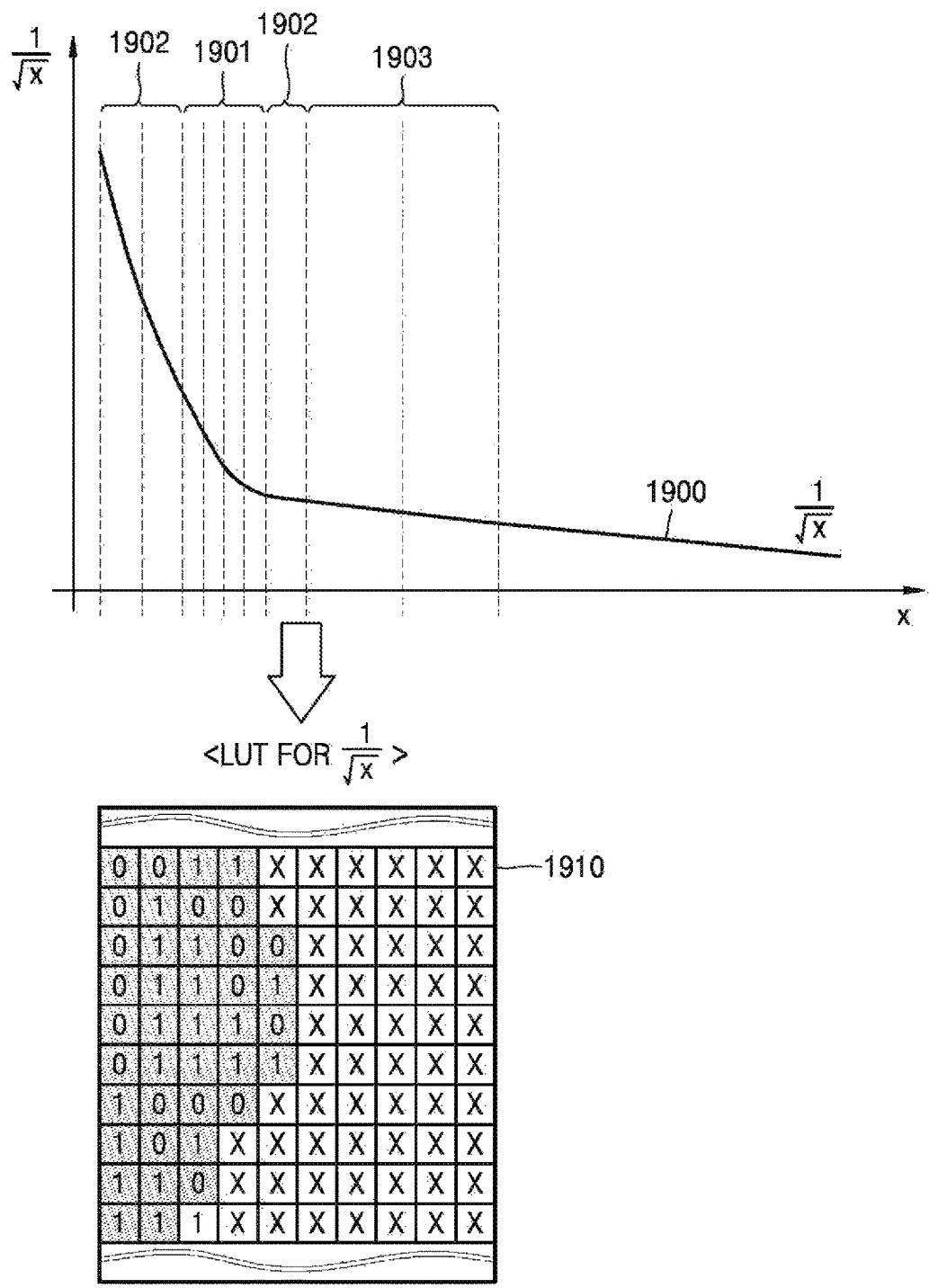
FIG. 19 is a diagram for describing an example of a method of determining numbers of upper bits for setting addresses of an LUT in a case of an elementary function $1/\sqrt{x}$.

FIG. 19 is a diagram for describing an example of a method 1910 of determining numbers of upper bits for setting addresses of an LUT in a case of an elementary function $1/\sqrt{x}$.

Referring to FIG. 19, variables in a graph 1900 of the elementary function $1/\sqrt{x}$ are split into variable sections 1901 through 1903 having non-uniform sizes. Also, numbers of upper bits for setting addresses of an LUT are non-uniform based on the non-uniform sizes of the variable sections 1901 through 1903. In FIG. 19, the non-uniform sizes of the variable sections 1901 through 1903 and the method 1910 are shown for convenience of description, but the example is not limited thereto.

Figure 20:
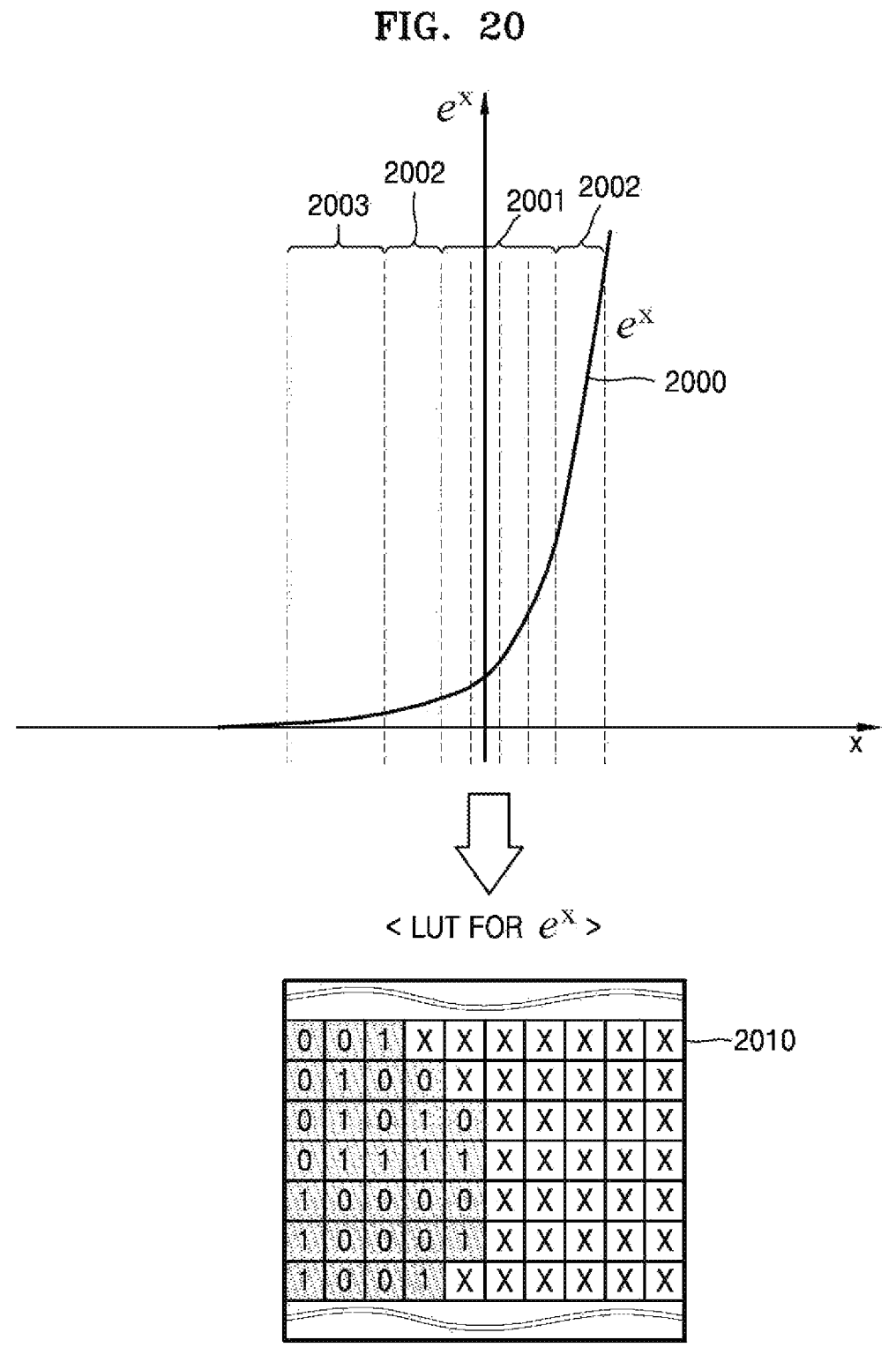

FIG. 20 is a diagram for describing an example of a method 2010 of determining numbers of upper bits for setting addresses of an LUT in a case of an elementary function $e^x$.

Referring to FIG. 20, variables in a graph 2000 of the elementary function $e^x$ are split into variable sections 2001 through 2003 having non-uniform sizes. Also, numbers of upper bits for setting addresses of an LUT are also non-uniform based on the non-uniform sizes of the variable sections 2001 through 2003. In FIG. 20, the non-uniform sizes of the variable sections 2001 through 2003 and the method 2010 are shown for convenience of description, but the example is not limited thereto.

Figure 21:
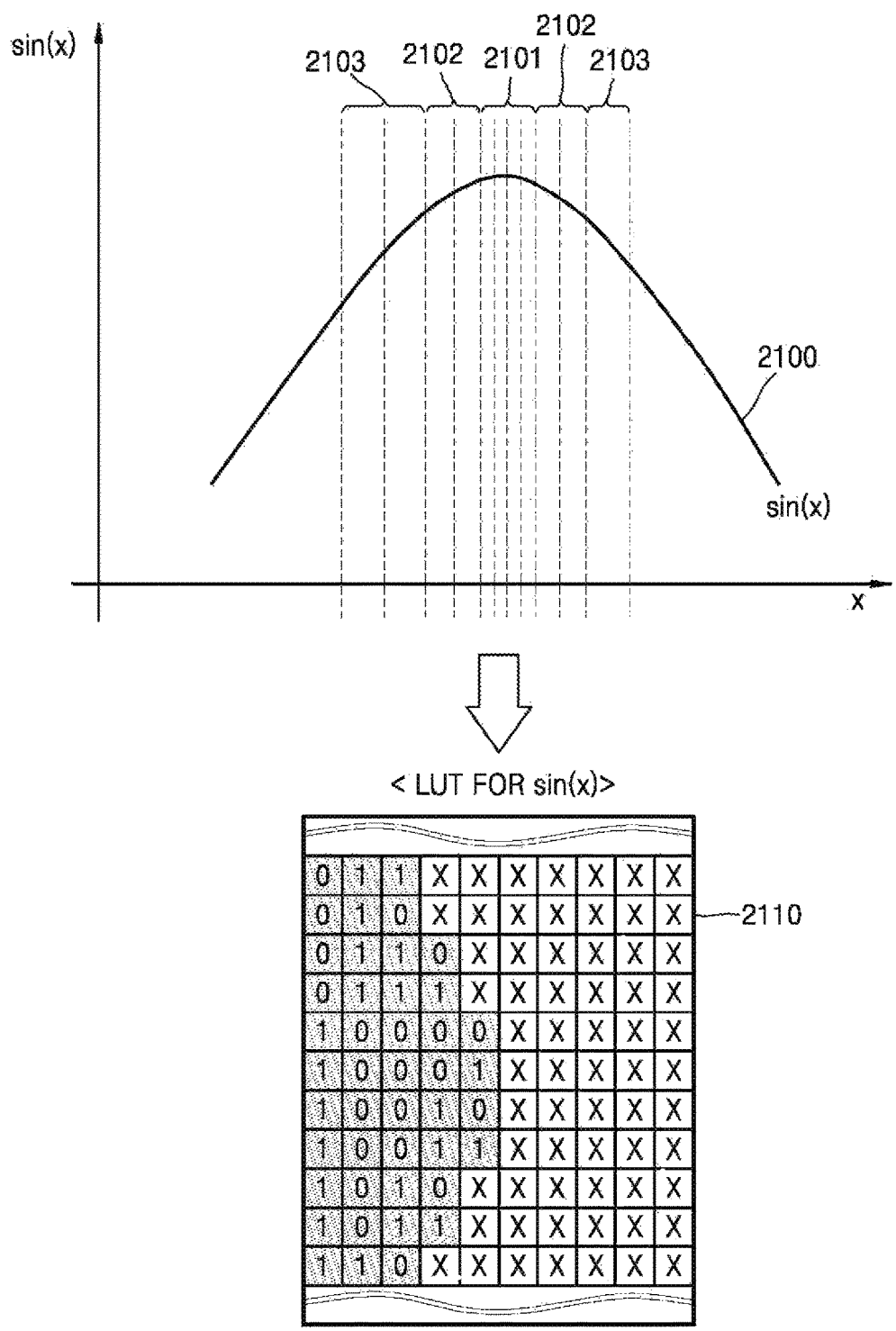
FIG. 21 is a diagram for describing an example of a method of determining numbers of upper bits for setting addresses of an LUT in a case of an elementary function $\sin(x)$.

FIG. 21 is a diagram for describing an example of a method 2110 of determining numbers of upper bits for setting addresses of an LUT in a case of an elementary function sin(x).

Referring to FIG. 21, variables in a graph 2100 of the elementary function sin(x) are split into variable sections 2101 through 2103 having non-uniform sizes. Also, numbers of upper bits for setting addresses of an LUT are non-uniform based on the non-uniform sizes of the variable sections 2101 through 2103. In FIG. 21, the non-uniform sizes of the variable sections 2101 through 2103 and the method 2110 are shown for convenience of description, but the example is not limited thereto.

In FIGS. 16 through 21, variable sections corresponding to curve sections and convergent sections of specific elementary functions are set to have non-uniform sizes to non-uniformly determine numbers of upper bits for determining addresses of an LUT. However, it will be apparent to one of ordinary skill in the art that that this technique may also be applied to other types of elementary functions in addition to the elementary functions described above with reference to FIGS. 16 through 21.

The memory device 20 in FIG. 6 stores LUTs including addresses based on methods of determining numbers of upper bits described above (for example, the methods 1610 through 2110). Also, the addressing unit 120 in FIG. 6 determines upper bits for addressing the LUTs when a variable for an arithmetic operation is input based on such methods (for example, the methods 1610 through 2110).

Figure 22:
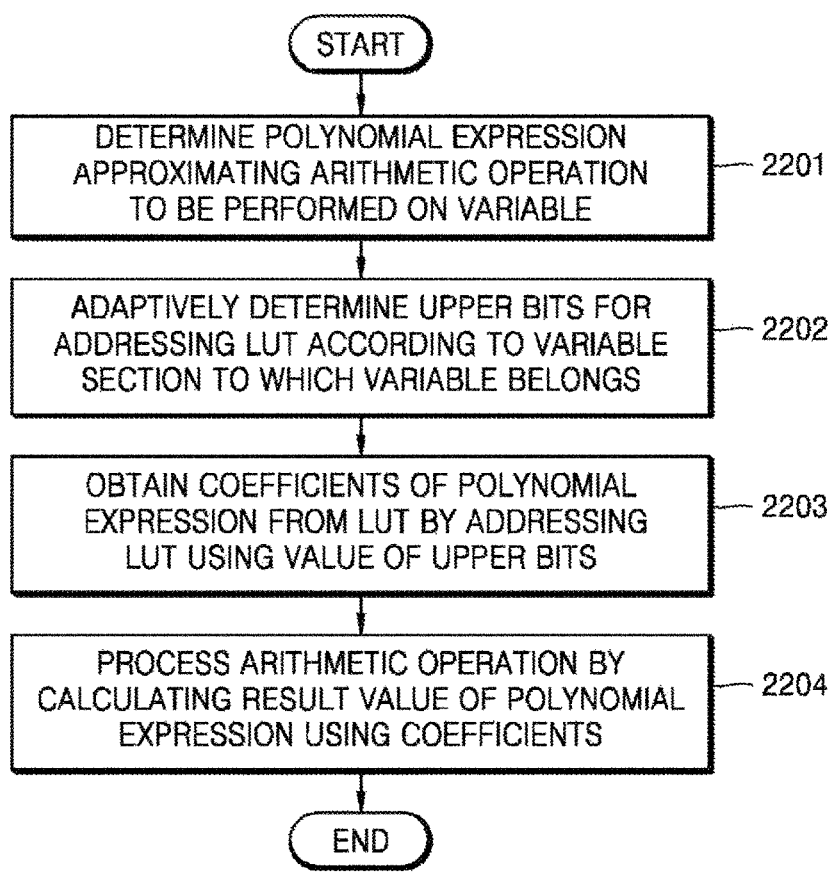
FIG. 22 is a flowchart of an example of a method of performing an arithmetic operation performed by a processing apparatus.

FIG. 22 is a flowchart of an example of a method of performing an arithmetic operation performed by the processing apparatus 10 in FIG. 6. Referring to FIG. 22, the method includes operations described above that are performed sequentially by the processing apparatus 10. Thus, the details described above are also applicable to the method of FIG. 22 even if omitted below.

In operation 2201, the polynomial expression converter 110 determines a polynomial expression approximating an arithmetic operation to be performed on a variable.

In operation 2202, the addressing unit 120 adaptively determines upper bits for addressing an LUT (for example, the LUT 200 of FIG. 1) according to a variable section to which the variable belongs.

In operation 2203, the obtainer 130 obtains coefficients of the polynomial expression from the LUT by addressing the LUT using a value of the upper bits.

In operation 2204, the calculator 140 performs the arithmetic operation by calculating a result value of the polynomial expression using the coefficients.

As described above, by non-uniformly setting numbers of upper bits to be used to address an LUT, errors between an arithmetic operation and polynomial expressions approximating the arithmetic operation are reduced, and thus a processing apparatus is able to perform the arithmetic operation accurately and precisely.

The computing system 1, the central processing unit (CPU) 11, the graphics processing unit (GPU) 12, the memory device 20, and the LUT 200 illustrated in FIG. 1, the LUT 310 illustrated in FIG. 3B, the LUT illustrated in FIG. 4B, the processing apparatus 10, the polynomial expression converter 110, the addressing unit 120, the obtainer 130, the calculator 140, and the memory device 20 illustrated in FIG. 6, the addressing unit 120, the calculator 140, and the LUT 1010 illustrated in FIG. 10, and the addressing unit 120, the calculator 140, and the LUT 1310 illustrated in FIG. 13 that perform the operations described herein with respect to FIGS. 1-22 are implemented by hardware components. Examples of hardware components include controllers, sensors, generators, drivers, memories, comparators, arithmetic logic units, adders, subtractors, multipliers, dividers, integrators, and any other electronic components known to one of ordinary skill in the art. In one example, the hardware components are implemented by computing hardware, for example, by one or more processors or computers. A processor or computer is implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices known to one of ordinary skill in the art that is capable of responding to and executing instructions in a defined manner to achieve a desired result. In one example, a processor or computer includes, or is connected to, one or more memories storing instructions or software that are executed by the processor or computer. Hardware components implemented by a processor or computer execute instructions or software, such as an operating system (OS) and one or more software applications that run on the OS, to perform the operations described herein with respect to FIGS. 1-22. The hardware components also access, manipulate, process, create, and store data in response to execution of the instructions or software. For simplicity, the singular term "processor" or "computer" may be used in the description of the examples described herein, but in other examples multiple processors or computers are used, or a processor or computer includes multiple processing elements, or multiple types of processing elements, or both. In one example, a hardware component includes multiple processors, and in another example, a hardware component includes a processor and a controller. A hardware component has any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The method illustrated in FIG. 22 that performs the operations described herein with respect to FIGS. 1-22 are performed by computing hardware, for example, by one or more processors or computers, as described above executing instructions or software to perform the operations described herein.

Instructions or software to control a processor or computer to implement the hardware components and perform the methods as described above are written as computer programs, code segments, instructions or any combination thereof, for individually or collectively instructing or configuring the processor or computer to operate as a machine or special-purpose computer to perform the operations performed by the hardware components and the methods as described above. In one example, the instructions or software include machine code that is directly executed by the processor or computer, such as machine code produced by a compiler. In another example, the instructions or software include higher-level code that is executed by the processor or computer using an interpreter. Programmers of ordinary skill in the art can readily write the instructions or software based on the block diagrams and the flow charts illustrated in the drawings and the corresponding descriptions in the specification, which disclose algorithms for performing the operations performed by the hardware components and the methods as described above.

The instructions or software to control a processor or computer to implement the hardware components and perform the methods as described above, and any associated data, data files, and data structures, are recorded, stored, or fixed in or on one or more non-transitory computer-readable storage media. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, and any device known to one of ordinary skill in the art that is capable of storing the instructions or software and any associated data, data files, and data structures in a non-transitory manner and providing the instructions or software and any associated data, data files, and data structures to a processor or computer so that the processor or computer can execute the instructions. In one example, the instructions or software and any associated data, data files, and data structures are distributed over network-coupled computer systems so that the instructions and software and any associated data, data files, and data structures are stored, accessed, and executed in a distributed fashion by the processor or computer.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A method of performing an arithmetic operation by a processing apparatus, the method comprising:
   determining, by the processing apparatus, a polynomial expression approximating an arithmetic operation to be performed on a variable;
   adaptively determining, by the processing apparatus, upper bits for addressing a look-up table (LUT) stored in a memory device according to a variable section to which the variable belongs;
   obtaining, by the processing apparatus, coefficients of the polynomial expression from the LUT by addressing the LUT using a value of the upper bits; and
   performing, by the processing apparatus, the arithmetic operation by calculating a result value of the polynomial expression using the coefficients,
   wherein determining the polynomial expression comprises non-uniformly splitting variables that can be input to the arithmetic operation into variable sections; and adaptively determining the upper bits comprises setting addresses of the LUT using numbers of upper bits, the numbers of upper bits respectively corresponding to sizes of the variable sections, and
   wherein setting the addresses of the LUT comprises setting the addresses of the LUT using a larger number of upper bits for a variable section in which an error between the polynomial expression and the arithmetic operation is large, and a smaller number of upper bits for a variable section in which the error is small.

2. The method of claim 1, wherein the adaptively determining of the upper bits comprises
   setting each of addresses of the LUT using non-uniform numbers of upper bits.

3. The method of claim 1, wherein a degree of non-uniformity of the variable sections is based on the error.

4. The method of claim 3, wherein
   the degree of non-uniformity of the variable sections depends on a type of the arithmetic operation; and
   the numbers of upper bits used to set the addresses of the LUT depend on the type of the arithmetic operation.

5. The method of claim 1, wherein the adaptively determining of the upper bits comprises
   determining a number of the upper bits based on a size of the variable section to which the variable belongs.

6. The method of claim 1, wherein
   the variable has n bits, and the upper bits are m upper bits of the n bits, wherein n and m are natural numbers;
   an input variable of the polynomial expression is a value of (n-m) lower bits of the variable; and
   the performing of the arithmetic operation comprises performing the arithmetic operation by calculating the result value of the polynomial expression using the input variable and the coefficients.

7. The method of claim 1, wherein
   the arithmetic operation is an arithmetic operation for evaluating an elementary function comprising any one or any combination of any two or more of a square root function, an inverse square root function, a reciprocal function, a log function, an exponential function, a power series function, and a trigonometric function.

8. The method of claim 1, wherein
   the determining of the polynomial expression comprises non-uniformly splitting variables that can be input to the arithmetic operation into variable sections; and
   the adaptively determining of the upper bits comprises setting addresses of the LUT to respectively correspond to the variable sections using the upper bits.

9. The method of claim 1, wherein the polynomial expression is a k-th order polynomial expression having (k+1) coefficients; and the (k+1) coefficients are mapped to each of addresses of the LUT.

10. A non-transitory computer-readable storage medium storing instructions for causing computing hardware to perform the method of claim 1.

11. A processing apparatus for performing an arithmetic operation, the processing apparatus comprising:
    a polynomial expression converter configured to determine a polynomial expression approximating an arithmetic operation to be performed on a variable;
    an addressing unit configured to adaptively determine upper bits for addressing a look-up table (LUT) according to a variable section to which the variable belongs;
    an obtainer configured to obtain coefficients of the polynomial expression from the LUT by addressing the LUT using a value of the upper bits; and a calculator configured to perform the arithmetic operation by calculating a result value of the polynomial expression using the coefficients, wherein the polynomial expression converter is further configured to non-uniformly split variables that can be input to the arithmetic operation into variable sections; and the addressing unit is further configured to set addresses of the LUT using numbers of upper bits, the numbers of upper bits respectively corresponding to sizes of the variable sections, and wherein the addressing unit is further configured to set the addresses of the LUT using a larger number of upper bits for a variable section in which an error between the polynomial expression and the arithmetic operation is large, and a smaller number of upper bits for a variable section in which the error is small.

12. The processing apparatus of claim 11, wherein the addressing unit is further configured to set each of addresses of the LUT using non-uniform numbers of upper bits.

13. The processing apparatus of claim 11, wherein
a degree of non-uniformity of the variable sections is based on the error.

14. The processing apparatus of claim 13, wherein
the degree of non-uniformity of the variable sections depends on a type of the arithmetic operation; and the numbers of upper bits used to set the addresses of the LUT depend on the type of the arithmetic operation.

15. The processing apparatus of claim 11, wherein the addressing unit is further configured to determine a number of the upper bits based on a size of the variable section to which the variable belongs.

16. The processing apparatus of claim 11, wherein
the variable has n bits, and the upper bits are m upper bits of the n bits, wherein n and m are natural numbers;
an input variable of the polynomial expression is a value of (n-m) lower bits of the variable; and
the calculator is further configured to perform the arithmetic operation by calculating the result value of the polynomial expression using the input variable and the coefficients.

17. The processing apparatus of claim 11, wherein
the polynomial expression converter is further configured to non-uniformly split variables that can be input to the arithmetic operation into variable sections; and
the addressing unit is further configured to set addresses of the LUT to respectively correspond to the variable sections using the upper bits.

* * * * *